(12) United States Patent
Sinder et al.

(10) Patent No.: US 10,049,681 B2
(45) Date of Patent: Aug. 14, 2018

(54) PACKET BEARING SIGNALING INFORMATION INDICATIVE OF WHETHER TO DECODE A PRIMARY CODING OR A REDUNDANT CODING OF THE PACKET

(71) Applicant: QUALCOMM Incorporated, San Diego, CA (US)

(72) Inventors: Daniel Jared Sinder, San Diego, CA (US); Subasingha Shaminda Subasingha, Weston, FL (US); Vivek Rajendran, San Diego, CA (US); Venkatraman Atti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/263,905

(22) Filed: Sep. 13, 2016

(65) Prior Publication Data
US 2017/0125028 A1 May 4, 2017

Related U.S. Application Data

(60) Provisional application No. 62/248,265, filed on Oct. 29, 2015, provisional application No. 62/248,275, filed on Oct. 29, 2015, provisional application No. 62/248,271, filed on Oct. 29, 2015.

(51) Int. Cl.
*G10L 19/00* (2013.01)
*G10L 19/16* (2013.01)
(Continued)

(52) U.S. Cl.
CPC .......... *G10L 19/167* (2013.01); *G10L 19/005* (2013.01); *H04L 1/007* (2013.01);
(Continued)

(58) Field of Classification Search
CPC .................. G10L 19/00; G10L 19/16
(Continued)

(56) References Cited

U.S. PATENT DOCUMENTS 6,731,625 B1 * 5/2004 Eastep .................... H04L 29/06
370/352
6,757,654 B1 * 6/2004 Westerlund ........... G10L 19/005
704/219

(Continued)

FOREIGN PATENT DOCUMENTS

WO 2013112703 A2 8/2013

OTHER PUBLICATIONS

Dietz et al. "Overview of the EVS codec architecture." Acoustics, Speech and Signal Processing (ICASSP), 2015 IEEE International Conference on. IEEE, 2015.*

(Continued)

*Primary Examiner* — Seong Ah A Shin
(74) *Attorney, Agent, or Firm* — Toler Law Group, P.C.

(57) ABSTRACT

An apparatus includes a network interface configured to receive, via a circuit-switched network, a packet. The packet includes a primary coding of a first audio frame, redundant coding of a second audio frame, and one or more bits that indicate signaling information. The signaling information corresponds to a decode operation of at least one of the primary coding or the redundant coding. The apparatus further includes a decoder configured to decode a portion of the packet based on the signaling information.

28 Claims, 15 Drawing Sheets

(51) Int. Cl.
*G10L 19/005* (2013.01)
*H04L 29/06* (2006.01)
*H04L 1/00* (2006.01)
*H04L 12/66* (2006.01)
*G10L 19/018* (2013.01)
*H04N 21/2389* (2011.01)

(52) U.S. Cl.
CPC ............ *H04L 1/0014* (2013.01); *H04L 12/66* (2013.01); *H04L 65/605* (2013.01); *G10L 19/018* (2013.01); *H04L 1/0045* (2013.01); *H04N 21/2389* (2013.01)

(58) Field of Classification Search
USPC .................................................. 704/229, 500
See application file for complete search history.

(56) References Cited

U.S. PATENT DOCUMENTS

| | | |
|---|---|---|
| 2002/0174434 A1 | 11/2002 | Lee et al. |
| 2011/0183649 A1 | 7/2011 | Ruan et al. |
| 2012/0210195 A1* | 8/2012 | Dui .................... H03M 13/3761 714/776 |
| 2013/0185062 A1* | 7/2013 | Krishnan ................ G10L 19/04 704/219 |
| 2013/0185084 A1* | 7/2013 | Rajendran ............... G10L 19/04 704/500 |
| 2015/0106106 A1* | 4/2015 | Atti ....................... H04L 1/0014 704/500 |
| 2017/0125029 A1 | 5/2017 | Atti et al. |

OTHER PUBLICATIONS

ETSI, "Technical Specification—http://www.etsi.org/deliver/etsi_ts/126400_126499/126454/13.00.00_60/ts_126454v130000p.pdf" May 2016.*

Lecomte et al. "Packet-loss concealment technology advances in EVS." Acoustics, Speech and Signal Processing (ICASSP), 2015 IEEE International Conference on. IEEE, 2015.*

International Search Report and Written Opinion—PCT/US2016/051767—ISA/EPO—dated Dec. 9, 2016.

* cited by examiner

PACKET BEARING SIGNALING INFORMATION INDICATIVE OF WHETHER TO DECODE A PRIMARY CODING OR A REDUNDANT CODING OF THE PACKET

I. CROSS-REFERENCE TO RELATED APPLICATIONS

The present application claims priority from U.S. Provisional Patent Application No. 62/248,265, filed Oct. 29, 2015, and entitled "COMMUNICATION BETWEEN PACKET-SWITCHED NETWORKS AND CIRCUIT-SWITCHED NETWORKS", U.S. Provisional Patent Application No. 62/248,271, filed Oct. 29, 2015, and entitled "COMMUNICATION BETWEEN PACKET-SWITCHED NETWORKS AND CIRCUIT-SWITCHED NETWORKS", and U.S. Provisional Patent Application No. 62/248,275, filed Oct. 29, 2015, and entitled "COMMUNICATION BETWEEN PACKET-SWITCHED NETWORKS AND CIRCUIT-SWITCHED NETWORKS"; the contents of each of the aforementioned applications are expressly incorporated herein by reference in their entirety.

II. FIELD

The present disclosure is generally related to communication between devices of packet-switched networks and devices of circuit-switched networks.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Electronic devices, such as wireless telephones, may send and receive data via networks. For example, audio data may be sent and received via a circuit-switched network (e.g., the public switched telephone network (PSTN), a global system for mobile communications (GSM) network, etc.) or a packet-switched network (e.g., a voice over internet protocol (VoIP) network, a voice over long term evolution (VoLTE) network, etc.). In a packet-switched network, audio packets may be individually routed from a source device to a destination device. Due to network conditions at the packet-switched network, the audio packets may arrive out of order, or one or more of the audio packets may arrive corrupted (or may not arrive at all). To compensate for errors due to network conditions, one or more audio packets may include coding for multiple audio frames. In a circuit-switched network, a device (e.g., a telephone) is configured to receive packets at a fixed interval (e.g., 20 milliseconds between each packet). Unlike in the packet-switched network, devices in the circuit-switched network are not configured to receive packets out of order or at unspecified times. Thus, forwarding packets directly from a packet-switched network to a circuit-switched network may cause difficulties for the devices of the circuit-switched network.

IV. SUMMARY

In a particular aspect, an apparatus includes a network interface configured to receive a packet via a circuit-switched network. The packet includes a primary coding of a first audio frame, redundant coding of a second audio frame, and one or more bits that indicate signaling information. The signaling information corresponds to a decode operation of at least one of the primary coding or the redundant coding. The apparatus further includes a decoder configured to decode a portion of the packet based on the signaling information.

In another aspect, a method includes receiving a packet at a network interface via a circuit switched network. The packet includes a primary coding of a first audio frame, redundant coding of a second audio frame, and one or more bits indicating signaling information. The signaling information corresponds to decoding of at least one of the primary coding or the redundant coding. The method further includes decoding a portion of the packet based on the signaling information.

In another aspect, an apparatus includes means for receiving a packet via a circuit-switched network. The packet includes a primary coding of a first audio frame, redundant coding of a second audio frame, and one or more bits that indicate signaling information. The signaling information corresponds to a decode operation of at least one of the primary coding or the redundant coding. The apparatus further includes means for decoding a portion of the packet based on the signaling information.

In another aspect, a computer-readable storage device stores instructions that, when executed by a processor, cause the processor to perform operations. The operations include receiving a packet at a network interface via a circuit switched network. The packet includes a primary coding of a first audio frame, redundant coding of a second audio frame, and one or more bits indicating signaling information. The signaling information corresponds to decoding of at least one of the primary coding or the redundant coding. The operations further include decoding a portion of the packet based on the signaling information.

In another particular aspect, an apparatus includes a first network interface. The first network interface is configured to receive a packet via a packet-switched network. The packet may include a primary coding of a first audio frame and a redundant coding of a second audio frame. The apparatus further includes a processor. The processor is configured to generate a modified packet that includes one or more bits that indicate signaling information. The signaling information may correspond to decoding of at least one of the primary coding or the redundant coding. The apparatus further includes a second interface configured to transmit the modified packet via a circuit-switched network.

In another aspect, a method of wireless communication includes receiving a packet via a packet-switched network at a first network interface. The packet may include a primary coding of a first audio frame and a redundant coding of a second audio frame. The method further includes generating a modified packet that includes one or more bits that indicate signaling information. The signaling information may correspond to decoding of at least one of the primary coding or the redundant coding. The method further includes transmitting the modified packet from a second network interface via a circuit-switched network.

In another aspect, an apparatus includes means for receiving a packet via a packet-switched network. The packet may include a primary coding of a first audio frame and a redundant coding of a second audio frame. The apparatus further includes means for generating a modified packet that includes one or more bits that indicate signaling information. The signaling information may correspond to decoding of at least one of the primary coding or the redundant coding. The apparatus further includes means for transmitting the modified packet via a circuit-switched network.

In another aspect, a computer-readable storage device stores instructions that, when executed by a processor cause the processor to perform certain operations. The operations include receiving a packet via a packet-switched network at a first network interface. The packet may include a primary coding of a first audio frame and a redundant coding of a second audio frame. The operations further include generating a modified packet that includes one or more bits that indicate signaling information. The signaling information may correspond to decoding of at least one of the primary coding or the redundant coding. The operations further include transmitting the modified packet from a second network interface via a circuit-switched network.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
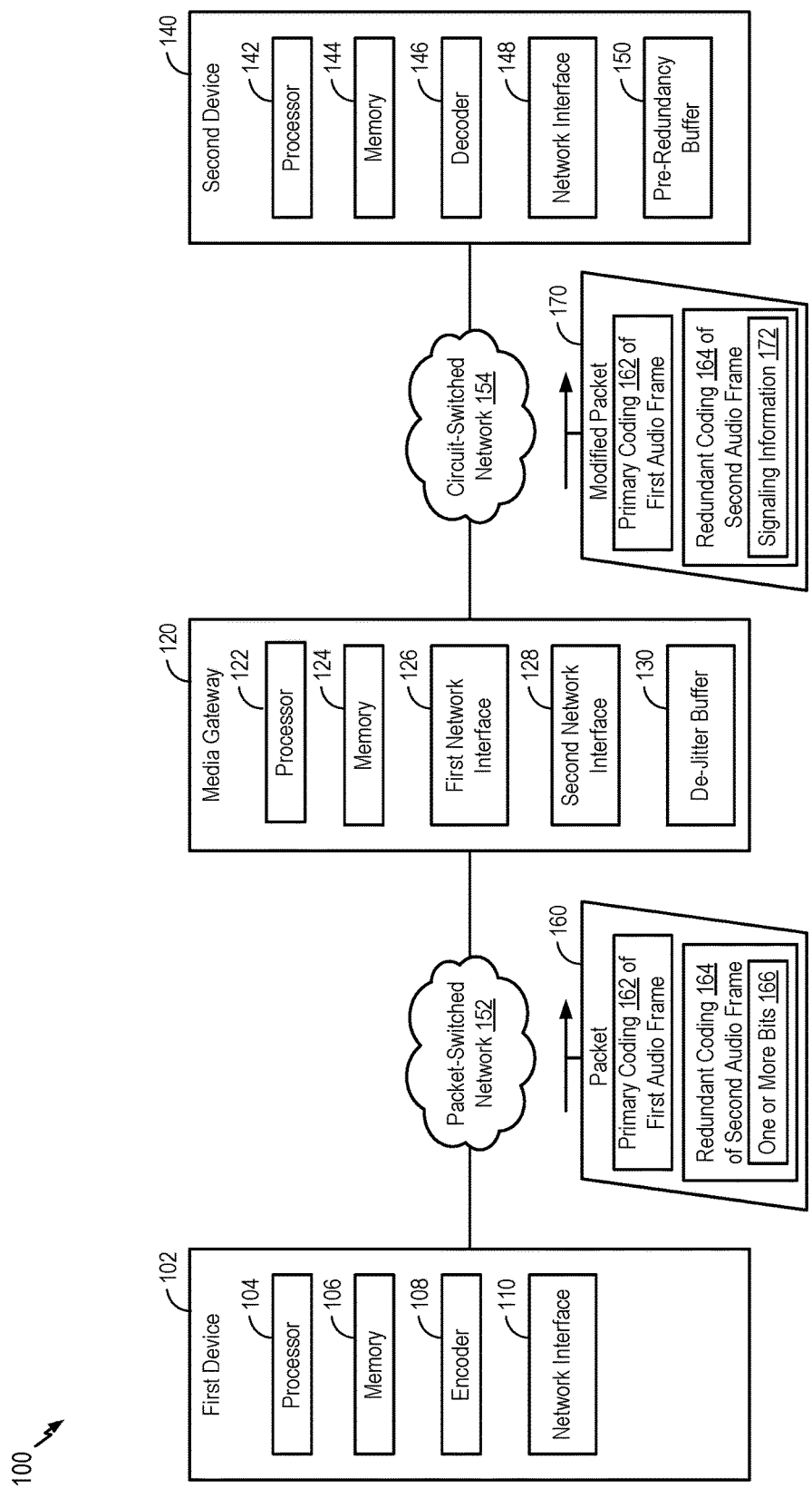
FIG. 1 is a block diagram of a particular implementation of a system configured to communicate redundant frame information and signaling information between a packet-switched network and a circuit-switched network.

Particular aspects of the present disclosure are described below with reference to the drawings. In the description, common features are designated by common reference numbers throughout the drawings. As used herein, various terminology is used for the purpose of describing particular implementations only and is not intended to be limiting. As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

Systems and methods of performing communication between packet-switched networks and circuit-switched networks are disclosed. A media gateway within a packet-switched network (or between a packet-switched network and a circuit-switched network) may receive a sequence of packets from a first device that is configured to communicate with the packet-switched network. For example, the media gateway may receive a sequence of packets from the first device during a voice call between the first device and a second device that is configured to communicate with a circuit-switched network. One or more of the packets may include coding associated with multiple audio frames for use in compensating for or concealing errors related to the packet-switched network by the media gateway. To illustrate, an (N+2)th packet may include primary coding of an (N+2)th audio frame and redundant coding of an Nth audio frame. The redundant coding includes one or more bits (e.g., one or more offset bits) used by a recipient device in decoding the packet. For example, the (N+2)th packet may include offset bits indicating an offset of two (e.g., an offset between the Nth audio frame and the (N+2)th audio frame).

The media gateway may be configured to send packets at a fixed interval (e.g., 20 milliseconds between packets) to the second device via the circuit-switched network. Due to network conditions at the packet-switched network, one or more of the packets may be corrupted, or one or more of the packets may not be received, by the media gateway. To conceal corruption errors or receipt errors (or to compensate for the errors), the media gateway may use redundant data from a different audio frame to generate a modified frame to provide to the second device. For example, if an error occurs with respect to receipt of the Nth packet at the media gateway and the (N+2)th packet is correctly received, the media gateway may use the (N+2)th packet for generating a modified packet to be sent to the second device during a time slot associated with the Nth audio frame. The modified packet may include at least the redundant coding of the Nth frame and an indication to decode the redundant coding. In a particular implementation, a signaling bit (e.g., a value of the signaling bit) may indicate the signaling information, and the signaling bit may be positioned within the modified packet. The position of the single bit within the modified packet 170 may depend on a channel aware (CA) frame type, a coder type, and a bandwidth mode as specified in an EVS standard. The signaling bit may replace a bit of the primary coding or a bit of the redundant coding. Alternatively, the signaling bit may be situated in another location of the payload of the modified packet. In another particular implementation, the media gateway may modify the (N+2)th packet by including one or more bits of the redundant coding (e.g., in the offset bits), the one or more bits (e.g., a value of the one or more bits) indicating the signaling information. In an alternate implementation, the media gateway may modify the (N+2)th packet by including a bit sequence (e.g., a predefined sequence of bit values) in padding bits of the primary coding of the (N+2)th audio frame. The signaling information (e.g., the signaling bit) or the bit sequence indicates to the second device that the redundant coding of the Nth packet is to be decoded to generate an audio frame. By providing a modified packet including redundant coding in place of a packet associated with an error, the media gateway is able to conceal (or compensate for) errors caused by network conditions of the packet-switched network.

In a particular implementation, the media gateway may modify the entire redundant coding (e.g., to all zero values, to all one values, to alternate one values and zero values, or to some other unique bit sequence that is not generated by a coder-decoder (CODEC) during generation of redundant coding) of the packet to signal that the primary coding of the packet is to be decoded at the second device (e.g., of the circuit-switched network). For example, if the Nth packet is available (e.g., in a de jitter buffer accessible to the media gateway), then the media gateway may send a modified Nth packet by modifying the entire redundant coding of the second audio frame in the Nth packet to indicate that the primary coding in the modified Nth packet is to be decoded at a time slot corresponding to N at the second device. The second device (e.g., a processor of the second device) may identify this modification in the redundant coding of the modified Nth packet and determine that the primary coding of the modified Nth packet is to be decoded. In another example, if the Nth packet is not available and a future packet (e.g., an (N+2)th packet that contains the redundant coding of the second audio frame) is available (e.g., in the de-jitter buffer), then the media gateway may send the unmodified (N+2)th packet to the second device via the circuit-switched network. The second device (e.g., a processor of the second device) may determine that the redundant coding has not been modified, and based on this determination, the second device may decode the redundant coding. The received future packet (e.g., the (N+2)th packet with the unmodified redundant coding) may be stored in a memory of the second device for use in pre-redundancy decoding if a corresponding packet is not received during the (N+2)th time slot at the second device.

Additionally or alternatively, the second device (of the circuit-switched network) may be configured to conceal (or compensate for) errors due to network conditions of the packet-switched network or the circuit-switched network. To illustrate, due to an error in the packet-switched network, the second device may receive a packet including primary coding of the (N+2)th audio frame and redundant coding of the Nth audio frame during a time slot associated with the Nth audio frame. Based on an indicator (e.g., the signaling information or the bit sequence), the second device may decode the redundant coding to generate an audio frame for playback at the second device. Additionally, the second device may store a copy of the primary coding of the (N+2)th audio frame in a memory. The second device may retrieve the copy of the primary coding of the (N+2)th audio frame from the memory. For example, if, due to an error condition of the circuit-switched network, the second device experiences a packet error during a time slot associated with the (N+2)th audio frame, the second device may retrieve the copy of the primary coding of the (N+2)th audio frame from the memory. The second device may decode the copy of the primary coding of the (N+2)th audio frame to generate an audio frame for playback at the second device. By storing copies of coding that are not used during decoding, the second device may be capable of concealing (or compensating for) packet errors caused by network conditions of the circuit switched network.

Referring to FIG. 1, a particular illustrative example of a system configured to communicate redundant frame information and signaling information between a packet-switched network and a circuit-switched network is shown and generally designated 100. The system 100 includes a first device 102, a media gateway 120, and a second device 140. The media gateway 120 may be configured to facilitate communication of data, such as audio frames, between the first device 102 and the second device 140. To illustrate, the first device 102 may communicate audio frames to the media gateway 120 via a packet-switched network 152, and the media gateway 120 may communicate audio frames to the second device 140 via a circuit-switched network 154. The packet-switched network 152 may include a VoIP network, a VoLTE network, or another packet-switched network. The circuit-switched network 154 may include a PSTN network, a GSM network, or another circuit-switched network. In a particular implementation, the first device 102, the second device 140, or both may include a communication device, a headset, a decoder, a smart phone, a cellular phone, a mobile communication device, a laptop computer, a computer, a tablet, a personal digital assistant (PDA), a set top box, a video player, an entertainment unit, a display device, a television, a gaming console, a music player, a radio, a digital video player, a digital video disc (DVD) player, a tuner, a camera, a navigation device, a vehicle, an on-board component of a vehicle, or a combination thereof. Although the first device 102 is described herein as transmitting packets and the second device 140 is described as receiving packets, in other implementations the first device 102 may receive packets from the second device 140. Accordingly, the illustration of FIG. 1 is not limiting.

The first device 102 may include a processor 104 (e.g., a central processing unit (CPU), a digital signal processor (DSP), etc.) and a memory 106. In a particular implementation, the memory 106 stores instructions executable by the processor 104 to perform various operations described herein. The first device 102 may also include an encoder 108 and a network interface 110. The encoder 108 may encode audio frames that are transmitted by the network interface 110. In a particular implementation, the encoder 108 may be part of a vocoder (a voice encoder-decoder) that is configured to perform encoding and decoding operations. The network interface 110 may be configured to transmit and to receive data, such as packets containing the audio frames, via the packet-switched network 152. The network interface 110 may be coupled to a transmitter, a receiver, or a transceiver to enable transmission and reception of the data via the packet-switched network 152.

The encoder 108 may encode a sequence of audio frames to generate a sequence of packets (e.g., audio packets). In a particular implementation, the sequence of audio frames includes multiple audio frames, such as an (N−1)th audio frame, an Nth audio frame, an (N+1)th audio frame, and an (N+2)th audio frame. The audio frames may be part of a sequence of audio frames that are to be decoded in order to produce an audio output at the second device 140. The sequence of audio frames may correspond to audio of a communication session, such as a voice call, as a particular example. The first device 102 may transmit the sequence of packets, including an illustrative packet 160, to the media gateway 120 via the packet-switched network 152. As further described herein, packets may be received at the media gateway 120 out of order or may be lost due to network conditions of the packet-switched network 152.

Each packet of the sequence of packets may include portions of one or more audio frames. For example, each packet may include an encoded low-band signal ("LB core") and high-band parameters ("HB parameters") of one or more audio frames. The LB core and HB parameters of an audio frame may collectively be referred to as a primary coding of the audio frame. In a particular implementation, each of the packets (or the audio frames) has a fixed size, and the amount of bandwidth (e.g., number of bits of an audio frame) allocated to the encoded LB core and to the HB parameters can be dynamically adjusted from audio frame to audio frame. To improve audio decoding performance in the presence of network errors in the packet-switched network 152, one or more of the audio frames may include "redundant" coding information of a previous audio frame. The redundant coding information may include low-band redundant coding information, high-band parameter redundant coding, or both. The redundant coding information for the low-band and high-band of a previous audio frame may collectively be referred to as a "partial copy" of the previous audio frame. In a particular implementation, the amount of bandwidth allocated to the low-band redundant coding information and to the high-band redundant coding information can be dynamically adjusted from audio frame to audio frame.

In a particular implementation, the HB to LB redundant coding information varies between a [25%, 75%] split and a [5%, 95%] split. As an example, the nominal encoding bitrate for an audio frame may be 13.2 kilobits per second (kps, alternatively abbreviated as kbps) when no redundant coding information is included in the audio frame. To accommodate the redundant coding information, the coding rate for the LB core and HB parameters of the audio frame may be reduced to 9.6 kps. The remaining 3.6 kps bandwidth may be used to encode the HB and LB redundant coding information for a previous audio frame, where the split between the HB and LB redundant coding information can vary from audio frame to audio frame between a [25%, 75%] split and a [5%, 95%] split. As another example, the primary coding may use 11.6 kps while the redundant coding may use 1.6 kps of the total 13.2 kps. As another example, the primary coding may use 12.6 kps while the redundant coding may use 0.6 kps of the total 13.2 kps. In other implementations, the bit rates and splits may be different. The bit rates and the splits may be determined by the encoder 108 based on source-controlled parameters and network or channel conditions.

To illustrate, the encoder 108 may encode redundant coding 164 of a second audio frame in the packet 160 that includes primary coding 162 of a first audio frame. For example, the first audio frame may be the (N+2)th audio frame, and the second audio frame may be the Nth audio frame. In this example, the packet 160 includes the primary coding 160 of the (N+2)th audio frame and the secondary coding 164 of the Nth audio frame. When packets containing audio frames are communicated via the packet-switched network 152, each packet may be routed individually to a destination device and audio frames may arrive out of order. Thus, even though a packet including primary coding of the second audio frame (e.g., the Nth audio frame) may be corrupted or may not arrive at the media gateway 120 (collectively referred to herein as "a receipt error" or as the packet being "unavailable"), the packet 160 may arrive (or may already have arrived) at the media gateway 120 intact. The redundant coding 164 in the packet 160 may be used by the media gateway 120 to reconstruct the second audio frame (or a portion thereof) or to compensate for (or conceal) an error caused by the receipt error.

The packet 160 may also include one or more bits 166 within the redundant coding 164 of the second audio frame. The one or more bits 166 may be used by a receiving device (e.g., the media gateway 120 or the second device 140) to facilitate decoding of the second audio frame. In a particular implementation, the one or more bits 166 of the packet 160 correspond to offset bits. The offset bits may indicate an offset between the first audio frame and the second audio frame in the sequence of audio frames. For example, the offset bits may indicate, for the packet 160, that the offset is two. To illustrate, the first audio frame (e.g., the (N+2)th audio frame) is offset from the second audio frame (e.g., the Nth audio frame) by two audio frames in the sequence of audio frames. The value of the offset may be defined by an industry standard (e.g., an enhanced voice services (EVS) standard), may be negotiated by the first device 102 and the second device 140, may be determined based on measured or estimated network errors, or a combination thereof. In a particular implementation, the offset may be two frames, three frames, five frames, or seven frames. In other implementations, the offset may be a different number of frames. The offset for each packet may be different. For example, the offset of a second packet may be three (e.g., the second packet may include primary coding of the (N+2)th audio frame, redundant coding of the (N−1)th audio frame). In other implementations, the one or more bits 166 of the packet 160 may correspond to a codec type indicator, a redundancy frame flag, a sharp flag, a mode indicator, a bandwidth extension (BWE) layers parameter, or a combination thereof, as further described with reference to FIG. 3.

The media gateway 120 includes a processor 122 and a memory 124. In a particular implementation, the memory 124 stores instructions executable by the processor 122 to perform various operations described herein. The media gateway 120 also includes a first network interface 126 and a second network interface 128. The first network interface 126 may be a packet-switched network interface that is configured to receive the packet 160 via the packet-switched network 152. The second network interface 128 may be a circuit-switched network interface that is configured to transmit modified packets, such as illustrative modified packet 170, via the circuit-switched network 154.

In a particular implementation, the media gateway 120 includes a buffer, which is illustrated in FIG. 1 as a de jitter buffer 130. The combination of the processor 122 and the de-jitter buffer 130 (or any components that perform the functions described with reference to the processor 122 and the de jitter buffer 130) may also be referred to as jitter buffer management (JBM). The first network interface 126 (or the processor 122) may store received packets (e.g., audio frames) in the de jitter buffer 130. Because packets transmitted over packet-switched networks can arrive out of order, the de-jitter buffer 130 may be used to store and reorder the received packets based on identifiers in the packets, such as timestamps or sequence numbers. In the presence of network errors (e.g., receipt errors), one or more packets (or portion(s) thereof) may not be received or may be corrupt. The media gateway 120 may store the packets in the de-jitter buffer 130 to be used to generate modified packets that compensate for (or conceal) receipt errors at the media gateway 120 (e.g., network errors in the packet-switched network 152).

The media gateway 120 may be configured to provide packets to the second device 140 via the circuit-switched network 154 at a fixed interval, in accordance with one or more settings or as defined in a circuit-switched network standard. For example, the media gateway 120 may transmit packets to the second device 140 at 20 millisecond intervals. If each packet is received without error from the first device 102, the media gateway 120 may forward the packets in order to the second device 140 via the circuit-switched network 154. However, due to network errors, one or more of the packets may be unavailable (e.g., one or more packets (or portion(s) thereof) may be corrupt or may not be received).

To compensate for (or conceal) the unavailability of a particular audio frame, the media gateway 120 may be configured to transmit a modified packet based on a different packet (e.g., a packet that includes redundant coding of the particular audio frame). For example, if there is an error in receiving a packet that includes primary coding of the second audio frame (e.g., the Nth audio frame), the media gateway 120 may modify the packet 160 to generate the modified packet 170, and the modified packet 170 may be transmitted to the second device 140. Further, if there is no error in receiving the Nth packet (e.g., a packet that includes primary coding of the second audio frame), the media gateway 120 may modify the Nth packet to generate the modified packet 170, and the signaling information 172 may indicate that the primary coding in the modified packet 170 is to be decoded. In a particular implementation illustrated in FIG. 1, the processor 122 may be configured to generate the modified packet 170 by representing signaling information 172 in the one or more bits 166 of the redundant coding 164. In other implementations, the signaling information 172 may be included in (e.g., represented by) other bit locations (other bit positions) in the modified packet 170, as further described herein.

The signaling information 172 may correspond to the decoding of the primary coding 162 or the redundant coding 164. For example, the signaling information 172 may indicate whether to decode the primary coding 162 or the redundant coding 164. In a particular implementation, the signaling information 172 may replace the one or more bits 166. For example, an offset field of the modified packet 170 may indicate the signaling information 172. Alternatively, the one or more bits 166 may indicate the signaling information 172 in addition to other information, such as radio link information, a channel error rate, or power control information, as non-limiting examples. As described above, the signaling information 172 indicates which portion of a packet (e.g., the primary coding or the redundant coding) to decode. In some implementations, a single signaling bit indicates the signaling information 172. The single signaling bit may be positioned within the modified packet 170. For instance, the single signaling bit may be positioned within the primary coding 162 of the first audio frame or within the redundant coding 164 of the second audio frame. Alternatively, the single signaling bit may be positioned at another location in the payload of the modified packet 170. The precise position of the single signaling bit within the modified packet 170 may depend on a channel aware (CA) frame type, a coder type, a bandwidth mode (e.g., super-wideband (swb) mode or wideband (wb) mode), or a combination thereof, and may be prescribed by one or more industry standards, such as the enhanced voice services (EVS) standard. For instance, in an implementation, the location of the single signaling bit may be determined based on the following table:

TABLE 1

| CA Frame Type | swb | | wb | |
|---|---|---|---|---|
| | Coder Type | b[i], {i = 0, 1, ... 263} | Coder Type | b[i], i = {0, 1, ... 263} |
| 6 | 2 | b[175] | 1, 2, 3 | b[187] |
| 5 | 1, 2, 3 | b[179] | 1, 2, 3 | b[191] |
| 4 | 2, 3 | b[182] | N/A | |
| 3 | 2, 3 | b[229] | 2, 3 | b[241] |
| 2 | 3 | b[229] | 3 | b[241] |
| 0, 1, 7 | N/A | | | |

Table 1 illustrates particular examples of positioning a signaling bit (e.g., the signaling information 172). The positioning of the signaling bit may depend on the CA frame type, coder type, and mode (e.g., swb or wb). The bit position is indicated in Table 1 by b [bit position]. For example, b[175] indicates that the signaling bit is the 175th bit of the frame. In a particular example, the CA frame is a type 3 CA frame, the coder is a type 3 coder, and the media gateway 120 operates in the swb mode. In this example, the signaling bit is located at the 229th bit position of the modified packet 170.

The processor 122 may be configured to generate the modified packet 170 in response to a determination that a second packet that includes primary coding of the second audio frame is unavailable. A determination that the second packet is unavailable may be based on a determination that the second packet is corrupt. Alternatively, a determination that the second packet is unavailable may be based on a determination that the second packet has not been received. The modified packet 170 may be transmitted during a time slot associated with the second audio frame, as further described with reference to FIG. 2.

To illustrate, if the packet that includes the primary coding of the Nth audio frame is unavailable and the packet 160 (including the redundant coding 164 of the Nth audio frame) is available, the processor 122 may generate the modified packet 170 based on the packet 160. To generate the modified packet 170, the processor 122 may include one or more bits 166, indicating the signaling information 172, in the redundant coding 164. The signaling information 172 may indicate that the redundant coding 164 is to be decoded. As an illustrative example, the media gateway 120 may operate in an enhanced voice services channel aware (EVS-CA) mode of operation, and the media gateway 120 may detect an unavailability (or error) of an Nth audio frame. The media gateway 120 may receive the redundant coding 164 of the second audio frame in the packet 160, which includes the primary coding 162 of the Nth audio frame. The media gateway 120 may be configured to encode and transmit the redundant coding 164 of an Nth audio frame along with the primary coding 162 of a future (N+k)th audio frame as the modified packet 170. The modified packet 170 may be transmitted to the second device 140. An offset parameter, k, may indicate a separation between the primary coding 162 of the audio frame and the redundant coding 164 of the audio frame. In a particular implementation, the modified packet 170 includes a first bit value representing the offset k, a second bit value indicating that the media gateway 120 is operating in a channel aware mode, and a third bit value corresponding to a length-index of the redundant coding 164 of the Nth audio frame. Additionally, the signaling bit (e.g., the signaling information 172) may be set to a logical one value. The logical one value of the signaling bit indicates that the redundant coding 164 of the Nth frame is to be decoded by the second device 140. Setting the signaling bit to the logical value may indicate a frame erasure (or other error) associated with the Nth frame to the second device 140.

In certain cases, such as if the media gateway 120 does not receive the Nth packet and the (N+k)th packet, the media gateway 120 may signal a frame erasure by refraining from sending the modified packet 170 to the second device 140. Additionally or alternatively, if the packet does not include a signaling bit (e.g., if the packet has a CA type 0, 1, or 7 as in Table 1), the media gateway 120 may signal a frame erasure by refraining from sending the modified packet 170 to the second device 140.

After generating the modified packet 170, the media gateway 120 may transmit the modified packet 170 to the second device 140 via the circuit-switched network 154. The modified packet 170 may enable the second device 140 to at least partially reconstruct the second audio frame (e.g., the Nth audio frame). Alternatively, to generate the modified packet 170, the processor 122 may include one or more bits 166, indicating the signaling information 172, in the primary coding 162.

The second device 140 includes a processor 142 and a memory 144. In a particular implementation, the memory 144 stores instructions executable by the processor 142 to perform various operations described herein. The second device 140 also includes a decoder 146 and a network interface 148. The network interface 148 may be a circuit-switched network interface that is configured to receive the modified packet 170 via the circuit-switched network 154. The network interface 148 may be coupled to a transmitter, a receiver, or a transceiver to enable transmission and reception of the data via the circuit-switched network 154. The decoder 146 may be configured to decode the packets received at the network interface 148. In a particular implementation, the decoder 146 may be part of a vocoder (a voice encoder-decoder) that is configured to perform encoding and decoding operations.

In a particular implementation, the second device 140 includes a buffer, which is illustrated in FIG. 1 as pre-redundancy buffer 150. Although the pre-redundancy buffer 150 is illustrated as separate from the memory 144, the pre-redundancy buffer 150 may be included in the memory 144 in some implementations. The network interface 148 (or the processor 142) may store unused portions of received packets (e.g., audio frames) in the pre-redundancy buffer 150. The unused portions may be stored in the pre-redundancy buffer 150 and may be retrieved to recover an audio frame corresponding to an unavailable packet.

To illustrate, the second device 140 may receive the modified packet 170 including the primary coding 162 of the first audio frame, the redundant coding 164 of the second audio frame, and the signaling information 172. The modified packet 170 may be received in place of a packet including primary coding of the second audio frame, which may have been unavailable at the media gateway 120. Based on the signaling information 172, the second device 140 may decode the redundant coding 164 to generate (or recover) the second audio frame for playback at the second device 140. Additionally, the second device 140 may store the primary coding 162 in the pre-redundancy buffer 150. During a later time slot associated with the first audio frame, the media gateway 120 may transmit the modified packet 170 with the signaling information 172 indicating that the primary coding 162 is to be decoded. Due to a network error at the circuit-switched network 154, the modified packet 170 may be unavailable (e.g., may be corrupt or may not have been received) during the later time slot. The second device 140 may retrieve the primary coding 162 from the pre-redundancy buffer 150 and may decode the primary coding 162 of the first audio frame to generate the first audio frame (e.g., the (N+2)th audio frame) for playback at the second device 140. The primary coding 162 may be retrieved in response to a determination that an error is associated with the time slot. In a particular implementation, the error is determined based on a determination that a second packet including primary coding of the first audio frame is corrupt. Alternatively, the error is determined based on a determination that a second packet including the primary coding of the first audio frame has not been received during the time slot.

The primary coding to be retrieved from the pre-redundancy buffer 150 may be determined based on an offset value. For example, the offset value for the primary coding 162 of the (N+2)th frame may be two, and if an error occurs during a time slot having an offset of two, the primary coding 162 may be retrieved. The offset value may be referred to as a frame error concealment (FEC) offset. In a particular implementation, the signaling information 172 indicates the offset between the first audio frame and the second audio frame. For example, the signaling information 172 may be a two bit value, a first value may indicate that the primary coding 162 is to be decoded, a second value may indicate that the secondary coding 164 is to be decoded and the offset is two, a third value may indicate that the secondary coding 164 is to be decoded and the offset is three, and a fourth value may indicate that the secondary coding 164 is to be decoded and the offset is five. In other implementations, the signaling information 172 may have more or fewer than two bits, and other offsets and other information may be indicated by the signaling information 172.

During operation, the first device 102 may encode and transmit a sequence of packets, including the packet 160, to the media gateway 120 via the packet-switched network 152. The media gateway 120 may buffer received packets (e.g., audio frames) in the de-jitter buffer 130. The media gateway 120 may transmit modified packets to the second device 140 via the circuit-switched network 154 at a fixed interval. In some implementations, the media gateway 120 may forward the packets that are received if no error occurs, and the second device 140 may be configured to decode primary coding in a packet by default. In other implementations, the media gateway 120 may include signaling information to indicate that the primary coding is to be decoded. If the media gateway 120 determines that a packet including primary coding of the second audio frame is unavailable, the media gateway 120 generates the modified packet 170 by including one or more bits 166, indicating the signaling information 172, in the redundant coding 164. The signaling information 172 corresponds to the decoding of at least one of the primary coding 162 or the redundant coding 164. In the modified packet 170 illustrated in FIG. 1, the signaling information 172 indicates that the redundant coding 164 is to be decoded. The one or more bits 166 include bits such as offset bits or other bits that relate to decoding of the first audio frame or the second audio frame, in contrast to other bits that do not relate to decoding the audio frames, such as codec mode request (CMR) bits that relate to a codec mode to be used for return communications from the second device 140 to the first device 102. In other implementations, one or more bits of the low-band core of the redundant coding 164, the high-band parameters of the redundant coding 164, or a combination thereof may indicate signaling information 172. In another implementation, a single bit of the redundant coding 164 may indicate signaling information 172. In a particular implementation, a "0" value of the single bit may indicate that the primary coding 162 is to be decoded, and a "1" value of the single bit may indicate that the redundant coding 164 is to be decoded.

In a particular implementation, the one or more bits 166 include offset bits, and the signaling information 172 replaces the offset bits. Replacing the offset bits at the media gateway 120 may be acceptable in implementations where the second device 140 does not include the pre-redundancy buffer 150 and does not store copies of received audio frames for use in case of errors at the circuit-switched network 154. Alternatively, the signaling information 172 may indicate the offset in addition to indicating whether the primary coding 162 or the redundant coding 164 is to be decoded. In another particular implementation, the redundant coding 164 is watermarked to indicate the signaling information 172. For example, the redundant coding 164 may be watermarked using a data steganography or data hiding technique to include the signaling information 172. The second device 140 may be capable of detecting and processing the watermarked redundant coding 164 to retrieve the signaling information 172. In a particular implementation, watermarking within the redundant coding 164 may be used to indicate signaling information 172. Alternatively, the presence of watermarking may correspond to the signaling information 172. For example, if the redundant coding 164 is watermarked, the second device 140 may determine to decode the redundant coding 164, and if the redundant coding 164 is not watermarked, the second device 140 may determine to decode the primary coding 162. In other implementations, the second device 140 may decode the primary coding 162 if the redundant coding 164 is watermarked, and the second device 140 may decode the redundant coding 164 if the redundant coding 164 is not watermarked.

After receiving the modified packet 170, the second device 140 may decode a portion of the modified packet 170 based on the signaling information 172 to generate an audio frame for playback at the second device 140. For example, the signaling information of the modified packet 170 may indicate that the redundant coding 164 is to be decoded, and the second device 140 may decode the redundant coding 164 of the second audio frame (e.g., the Nth audio frame) to generate the second audio frame for playback. Additionally, the second device 140 may store the primary coding 162 in the pre-redundancy buffer 150. If an error occurs during a time slot associated with the first audio frame (e.g., the (N+2)th audio frame), the second device 140 may retrieve the primary coding 162 from the pre-redundancy buffer 150 to generate the first audio frame (e.g., the (N+2)th audio frame) for playback.

The system 100 of FIG. 1 enables the media gateway 120 to use redundant frame information to provide modified packets with signaling information to a circuit-switched network device (e.g., the second device 140). The signaling information 172 indicates to the second device 140 which portion of the modified packet 170 is to be decoded. Thus, a packet having redundant coding of a particular audio frame may be provided to the second device 140 if a packet having primary coding is unavailable, and the redundant coding may be used by the second device 140 to compensate for (or conceal) network errors in the packet-switched network 152. In addition, the second device 140 may store copies of unused portions of packets in the pre-redundancy buffer 150. The copies may be retrieved and used to decode a particular audio frame when a packet including the primary coding of the particular audio frame is unavailable (e.g., corrupt or not received) during the associated time slot. Thus, the second device 140 may also compensate for (or conceal) network errors in the circuit-switched network 154.

In the above description, various functions performed by the system 100 of FIG. 1 are described as being performed by certain components. However, this division of components is for illustration only. In an alternate implementation, a function performed by a particular component may instead be divided amongst multiple components. Moreover, in an alternate implementation, two or more components of FIG. 1 may be integrated into a single component. Each component illustrated in FIG. 1 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 2:
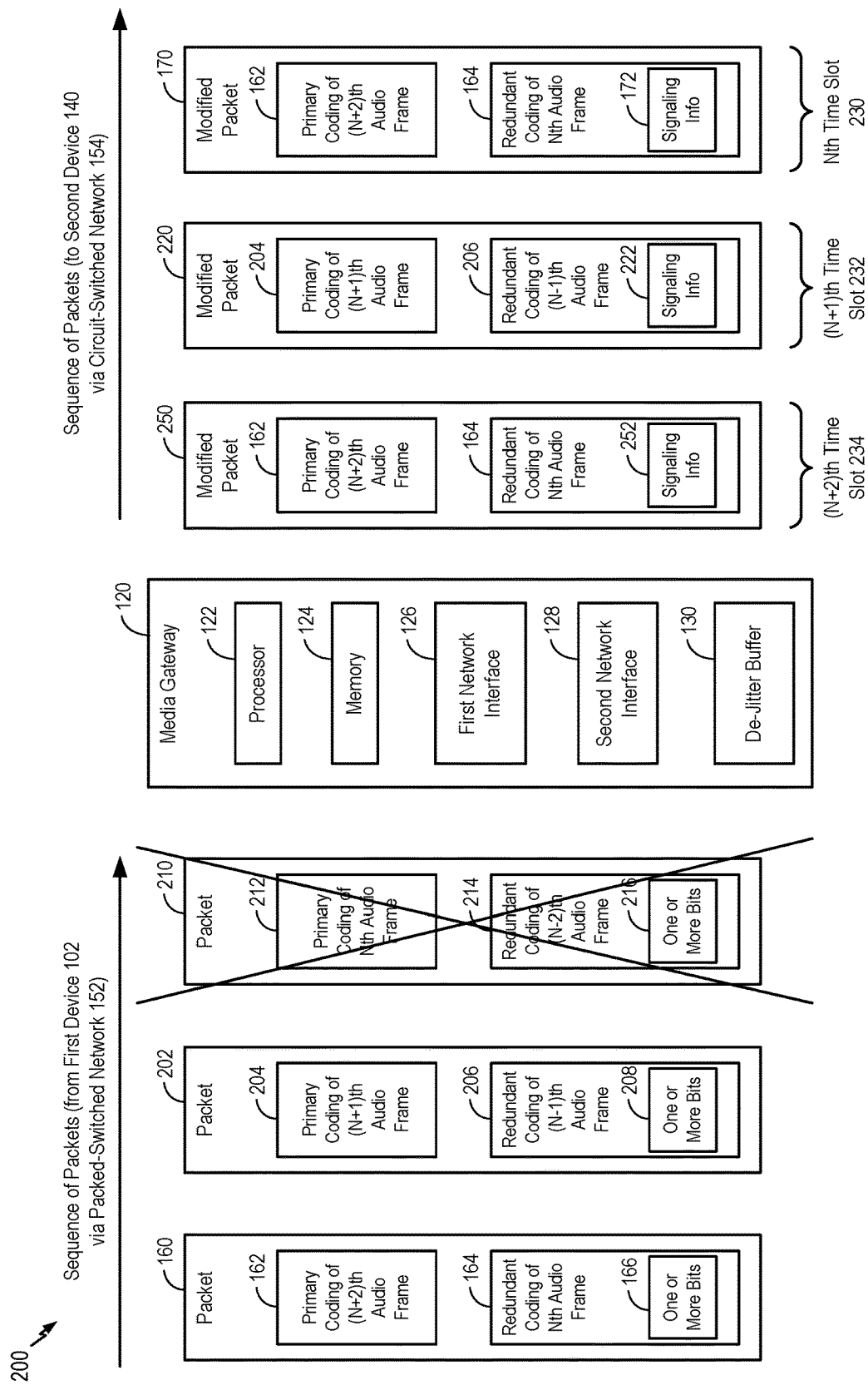
FIG. 2 is a diagram of a particular implementation of modifying a sequence of packets at a media gateway to include one or more bits that indicate signaling information.

Referring to FIG. 2, a diagram of a particular implementation of modifying a sequence of packets at a media gateway to indicate signaling information is shown and generally designated 200. The media gateway may include or correspond to the media gateway 120 of FIG. 1.

As packets are received by the first network interface 126, the packets (e.g., the audio frames) may be stored in the de-jitter buffer 130. As described with reference to FIG. 1, due to network conditions at the packet-switched network 152, the packets sent by a source device (e.g., the first device 102) may arrive out of order, may be corrupted, or may not arrive at all. The media gateway 120 (e.g., the processor 122) may retrieve packets (e.g., audio frames) from the de-jitter buffer 130 according to a packet sequence or a frame sequence. For example, the packets may be retrieved based on sequence numbers, timestamps, or other sequencing information included in the packets. To illustrate, the media gateway 120 may attempt to retrieve an Nth packet 210 prior to an (N+1)th packet 202, and the media gateway 120 may attempt to retrieve the (N+1)th packet 202 prior to the (N+2)th packet 160.

In a particular implementation, each of the packets of the packet sequence includes coding of multiple audio frames. For example, the Nth packet 210 includes primary coding 212 of the Nth audio frame and redundant coding 214 of the (N−2)th audio frame, the (N+1)th packet 202 includes primary coding 204 of the (N+1)th audio frame and redundant coding 206 of the (N−1)th audio frame, and the (N+2)th packet 160 includes primary coding 162 of the (N+2)th audio frame and redundant coding 164 of the Nth audio frame. Alternatively, one or more packets may include coding of a single audio frame (e.g., primary coding of a single audio frame). The redundant coding 164, 206, and 214 may also include the one or more bits 166, 208, and 216, respectively. The one or more bits 216, 208, and 166 may include information associated with the audio frames. For example, the one or more bits 216, 208, and 166 may be offset bits. For ease of illustration, additional packets of the packet sequence, such as an (N−1)th packet, an (N+3)th packet, etc., are not shown in FIG. 2.

The media gateway 120 may provide modified packets to the second device 140 via the circuit-switched network 154 at fixed intervals. For example, the media gateway may provide a packet corresponding to the Nth audio frame during an Nth time slot 230, a packet corresponding to the (N+1)th audio frame during an (N+1)th time slot 232, and a packet corresponding to the (N+2)th audio frame during an (N+2)th time slot 234. The media gateway 120 may determine a packet to be modified for providing to the second device 140 based on whether a corresponding packet has been received from the first device 102 without errors.

In the example illustrated in FIG. 2, the Nth packet 210 is unavailable for use in generating a modified packet. For example, the media gateway 120 may determine that the Nth packet 210 is not available in the de-jitter buffer 130 (e.g., that the Nth packet 210 has not been received). As another example, the media gateway 120 may determine that the Nth packet 210 is in the de-jitter buffer 130, but an error may occur during decoding of the Nth packet 210 (e.g., the Nth packet 210, or a portion thereof, is corrupt). Based on a determination that the Nth packet 210 is unavailable (either due to corruption or not being received), the media gateway 120 may check whether redundant frame information for the Nth audio frame is available in the de-jitter buffer 130. For example, the media gateway 120 may check each packet in the de-jitter buffer 130, and based on an identifier (e.g., a sequence identifier, a timestamp, etc.) and an offset value, the media gateway 120 may determine whether redundant information of the Nth audio frame is available.

As illustrated in FIG. 2, the (N+2)th packet 160 includes the redundant coding 164 of the Nth audio frame. The media gateway 120 may generate the modified packet 170 by modifying the (N+2)th packet 160 (e.g., the redundant coding 164) to indicate the signaling information 172 which specifies that the redundant coding 164 is to be decoded. After generating the modified packet 170, the media gateway 120 may transmit the modified packet 170 to the second device 140 during the Nth time slot 230. The second device 140 may receive the modified packet 170 with the signaling information 172, decode the redundant coding 164 of the Nth audio frame based on the signaling information 172, and generate the Nth audio frame for playback at the second device 140. Thus, the modified packet 170 with the signaling information 172 may enable the second device 140 to compensate for (or conceal) an error in the packet-switched network 152. If the packet 160 including the redundant coding 164 of the Nth audio frame is not available in the de-jitter buffer 130, the media gateway 120 may perform a different error concealment operation. Although illustrated in FIG. 2 as being included in redundant coding, in other implementations, one or more bits may be included in other portions of modified packets to indicate signaling information. For example, a primary coding of modified packets may indicate signaling information. As another example, other portions of payloads of modified packets may indicate signaling information, as further described with reference to FIG. 3.

If a corresponding packet is received without error at the media gateway 120, the media gateway 120 may modify the packet to include one or more bits to indicate signaling information. For example, the one or more bits specifying that the primary coding is to be decoded. The media gateway 120 may transmit the modified packet to the second device 140 during the corresponding time slot. For example, the media gateway 120 may receive the (N+1)th packet 202 without error, generate the modified packet 220 including the signaling information 222 within the redundant coding 206 that indicates that the primary coding 204 of the (N+1)th audio frame is to be decoded, and transmit the modified packet 220 to the second device 140 during the (N+1)th time slot 232. As another example, the media gateway 120 may receive the (N+2)th packet 160 without error, generate the modified packet 250 including signaling information 252 within the redundant coding 164 that indicates that the primary coding 162 of the (N+2)th audio frame is to be decoded, and transmit the modified packet 250 to the second device 140 during the (N+2)th time slot 234. As illustrated in FIG. 2, the modified packets 170 and 250 may include the same primary coding 162 and redundant coding 164, but the signaling information 172 and 252 are different to indicate that different portions are to be decoded.

Thus, FIG. 2 illustrates how the media gateway 120 is able to use redundant coding of audio frames stored in the de-jitter buffer 130 to provide a modified frame when a packet including primary coding of a particular audio frame is unavailable. Providing the modified frame with signaling information indicating that the redundant coding of the particular audio frame is to be decoded enables the second device 140 to generate the particular audio frame for playback at the second device 140 and may compensate for (or conceal) a network error in the packet-switched network 152.

Figure 3:
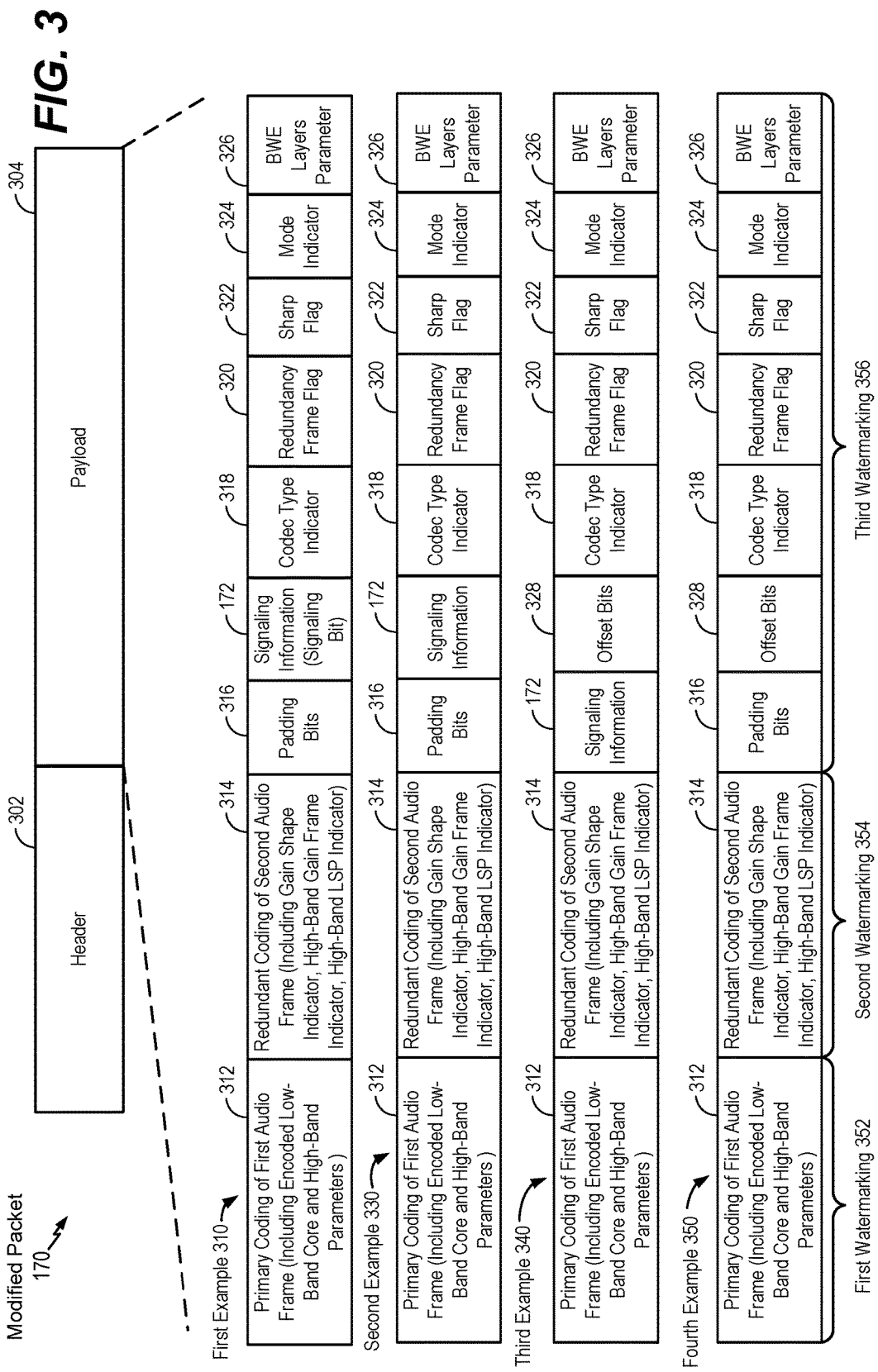
FIG. 3 is a diagram of examples of modified audio packets that include signaling information.

FIG. 3 illustrates examples of payloads of the modified packet 170 of FIG. 1. As illustrated in FIG. 3, the modified packet 170 includes a header 302 and a payload 304. The header 302 may include one or more header bits. The payload 304 may include data bits (e.g., of the primary coding 162 and the redundant coding 164) or other bits, as further described herein. The payload 304 may be modified in a variety of ways to include one or more bits that indicate the signaling information 172, as illustrated by examples 310, 330, 340, and 350 of FIG. 3.

The payload 304 may include a primary coding region 312 of a first audio frame (e.g., the (N+2) audio frame of FIGS. 1 and 2) and a redundant coding region 314 of a second audio frame (e.g., the Nth audio frame of FIGS. 1 and 2). The redundant coding region 314 may also include a padding bits region 316, an offset bits region 328, a codec type indicator region 318, a redundancy frame flag region 320, a sharp flag region 322, a mode indicator region 324, and a bandwidth extension (BWE) layers parameter region 326. The primary coding region 312 may also include additional bits or regions, such as padding bits, that are not illustrated for convenience. The arrangement of the regions of the modified packet 170 in FIG. 3 is for convenience and is not limiting. In other implementations, the regions 312-328 may be arranged in a different order than shown in FIG. 3. Additionally, one or more regions may be omitted, and one or more additional regions may be included in the modified packet 170. In addition, the sizes of the regions 312-328 may be different than described herein. In a particular implementation, the number, arrangement, and sizes of the regions of the modified packet 170 are defined in one or more wireless communication standards, such as an EVS standard.

The primary coding region 312 includes the primary coding 162 of the first audio frame. The primary coding 162 may include an encoded low-band core of the first audio frame and high-band parameters of the first audio frame. The redundant coding region 314 may include the redundant coding 164 of the second audio frame. The redundant coding 164 may include a gain shape indicator associated with a high-band gain shape of the second audio frame. Additionally or alternatively, the redundant coding may include a high-band gain frame indicator associated with a high-band gain shape of the first audio frame. Additionally or alternatively, the redundant coding may include a high-band line spectral pair (LSP) indicator associated with high-band LSPs of the second audio frame.

To illustrate, an audio frame may include an encoded low-band portion, designated "low-band core." The encoded low-band portion may include low-band linear prediction filter and excitation information. For example, the encoded low-band portion may include low-band LSP index(es) and low-band excitation information. In alternative implementations, the low-band core of an audio frame may include different information. The audio frame may also include high-band parameters. The high-band parameters occupy less space than the encoded low-band core and include a set of parameters that can be used by a decoder, in accordance with an audio signal coding model, to reconstruct a high-band portion of an audio frame. In the example of FIG. 3, the high-band parameters may include a transformed low-band excitation information, a high-band gain shape, a high-band gain frame, and high-band LSP index(es). In alternative implementations, an audio frame may include different high-band parameters.

In a particular implementation, the low-band LSP index (es) and low-band excitation information, the transformed low-band excitation information, the high-band gain shape, the high-band gain frame, and the HB high-band LSP index(es) are generated during audio analysis at an encoder (e.g., the encoder 108 of FIG. 1). For example, an audio signal may be passed through an analysis filter bank that separates the audio signal into a low-band signal and a high-band signal. The low-band and high-band signals may or may not overlap. The low-band signal may be input into a linear prediction (LP) analysis module that encodes a spectral envelope of the low-band signal as a set of LP coefficients (LPCs). A transform module may transform the LPCs into LSPs, which may alternately be referred to as line spectral pairs (LSPs). A quantizer may quantize the LSPs by identifying an entry of a low-band LSP codebook that is "closest to" the LSPs. The quantizer may output the index of the entry in the codebook as the low-band LSP index(es). The low-band analysis module may also generate the low-band excitation information and the transformed low-band excitation information. For example, the low-band excitation information may be an encoded signal that is generated by quantizing a LP residual signal generated during the LP process performed by the LP analysis module. The LP residual signal may represent prediction error.

A high-band analysis module may receive the high-band signal from the analysis filter bank and the low-band excitation signal from the low-band analysis module. The high-band analysis module may generate the high-band LSP index(es) using a LPC coding, transform, and quantization process similar to the process described to generate the low-band LSP index(es) and low-band excitation information. The high-band LSP index(es) may occupy fewer bits than the low-band LSP index(es). The high-band analysis module may also generate the high-band gain shape and the high-band gain frame. The high-band gain shape and high-band gain frame may enable a decoder (e.g., the decoder 146 of FIG. 1) to adjust high-band gain shape and frame gain to more accurately reproduce the high-band signal. The primary coding 162 and the redundant coding 164 may include one or more of the above described values, with reference to the first audio frame and the second audio frame, respectively.

Returning to the modified packet 170, the padding bits region 316 includes one or more padding bits of the redundant coding 164. Padding bits may be added to the primary coding 162, the redundant coding 164, or some other portion of the packet 160 so that the packet 160 (or a portion thereof) has a fixed size. The offset bits region 328 includes one or more offset bits (e.g., FEC offset bits) that indicate an offset between the first audio frame and the second audio frame in the sequence of frames. The codec type indicator region 318 includes bits indicating a codec type used to decode the first audio frame, the second audio frame, or both. The redundancy frame flag region 320 includes a redundancy frame (RF) flag that indicates whether the modified packet 170 includes redundant frame information. The sharp flag region 322 includes a sharp flag (e.g., a harmonic pitch sharpness flag) that indicates whether a harmonic pitch of an audio frame is "sharp." The mode indicator region 324 includes a mode indicator that indicates an operating mode to be used by a decoder, such as a primary operating mode or a wide-band (WB) operating mode. The BWE layers parameter region 326 includes one or more parameters associated with coding high-band signals using BWE.

The media gateway 120 of FIG. 1 may be configured to include the one or more bits indicating the signaling information 172 in the modified packet 170 (e.g., in the redundant coding 164) using a variety of techniques. In a first example 310, a single signaling bit located in the payload 304 may indicate the signaling information 172. The location of the signaling bit in the payload 304 may depend upon a channel aware (CA) frame type, a coder type, a bandwidth mode (e.g., super-wideband (swb) mode or wideband (wb) mode), or a combination thereof. For example, if the CA frame type has a first value, if the bandwidth mode is a swb mode, and if the coder type has a first value, then the signaling bit may be located in a first region of the payload 304. Conversely, if the CA frame has the first value, if the bandwidth mode is a wb mode, and if the coder type has the first value, then the signaling bit may be located in a second region of the payload 304 that is distinct from the first region.

In a second example 330 of the payload 304, the offset bits region 328 may indicate the signaling information 172. In a particular implementation, the signaling information 172 may replace the offset bits. Alternatively, a value of the signaling information 172 may represent which audio frame is to be decoded and the offset value. In a third example 340 of the payload 304, the padding bits region 316 may indicate the signaling information 172. The signaling information 172 may replace some or all of the padding bits.

In a fourth example 350 of the payload 304, one or more bits of the payload 304 may be watermarked to indicate signaling information. Watermarking may be performed using any data hiding or data steganography technique that is capable of including additional data (e.g., the signaling information 172) in watermarked data. In a particular implementation, the second device 140 may be configured to decode watermarked data to retrieve the stored data (e.g., the signaling information 172). In other implementations, the presence of watermarking may be indicative of the signaling information 172. For example, the presence of watermarking may indicate that the primary coding 162 of the first audio frame is to be decoded, and the absence of watermarking may indicate that the redundant coding 164 of the second audio frame is to be decoded. Alternatively, the presence of watermarking may indicate that the redundant coding 164 of the second audio frame is to be decoded, and the absence of watermarking may indicate that the primary coding 162 of the first audio frame is to be decoded. In a particular implementation, a first watermarking 352 may be applied to the primary coding 162 to include the signaling information 172. In another particular implementation, a second watermarking 354 may be applied to the redundant coding 164 to include the signaling information 172. In another particular implementation, a third watermarking 356 may be applied to data in one or more of the regions 316-328 to include the signaling information 172.

In a fifth example (not depicted), one or more bits of the codec type indicator region, the redundancy frame flag region, the sharp flag region, the mode indicator region, the BWE layers parameter region, or a combination thereof may indicate the signaling information. The signaling information may replace one or more bits of any of the regions in this example. In a particular implementation, the signaling information may also incorporate the information of the replaced bits. For example, a value of the signaling information may indicate whether to decode the primary coding or the redundant coding and may additionally indicate the offset between the first audio frame and the second audio frame.

Thus, FIG. 3 illustrates various techniques for generating a modified packet that includes one or more bits that indicate signaling information 172. Because the signaling information 172 is included in the modified packet 170, the second device 140 is able to know which audio frame (e.g., the primary coding 162 of the first audio frame or the redundant coding 164 of the second audio frame) is to be decoded to generate a particular audio frame. Thus, packets having redundant information may be used by devices in a circuit-switched network to compensate for (or to conceal) network errors of a packet-switched network.

Figure 4:
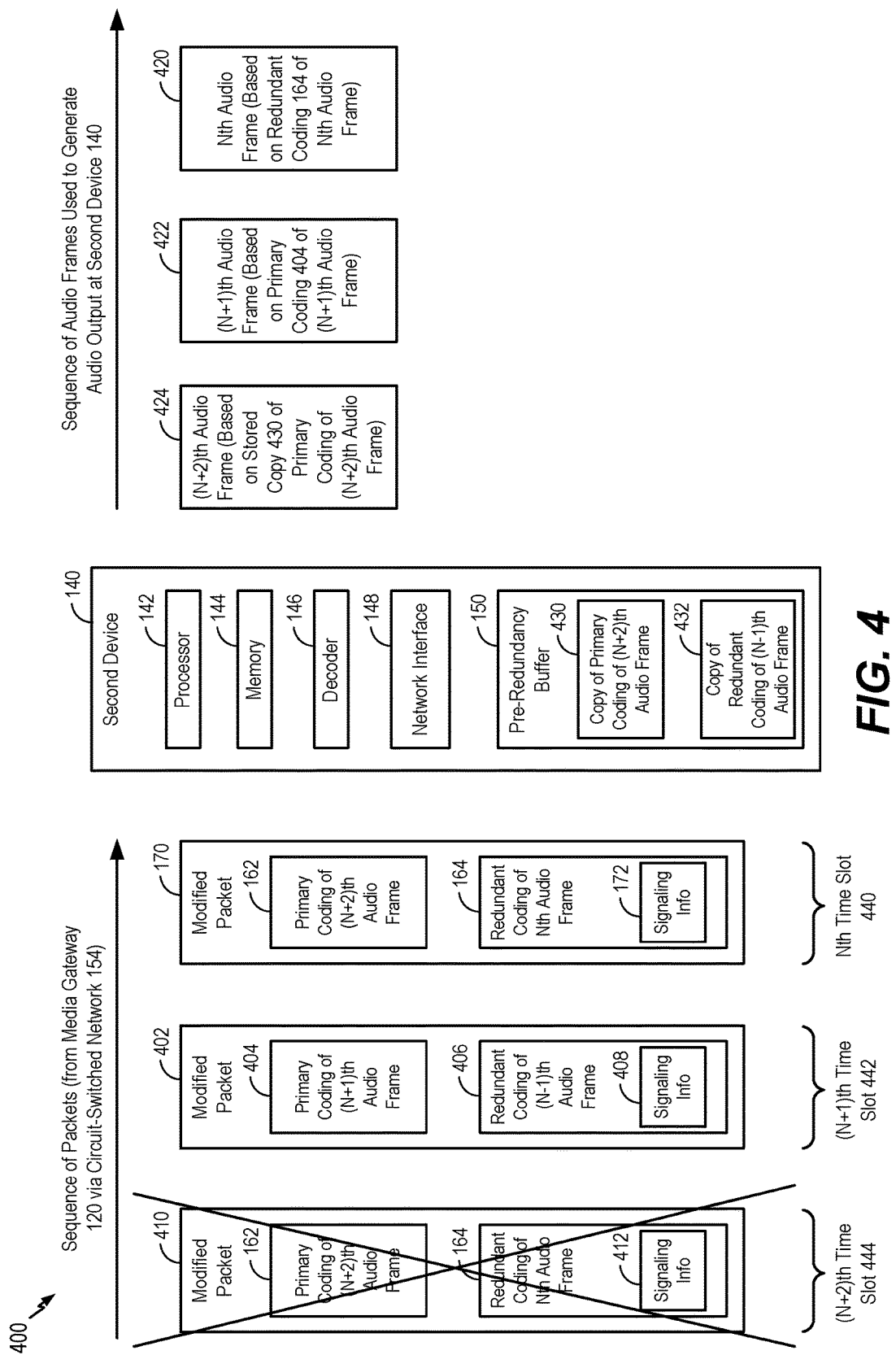
FIG. 4 is a diagram of a first implementation of retrieving unused frame information to generate audio frames.

Referring to FIG. 4, a diagram of a first implementation of retrieving unused frame information to generate audio frames is shown and generally designated 400. The unused frame information may be stored at a memory of a destination device in a circuit-switched network. The destination device may include or correspond to the second device 140 in the circuit-switched network 154 of FIG. 1.

As packets are received by the network interface 148, the packets may be decoded and a portion of the packets may be used to generate audio frames for playback at the second device 140. The portion that is not used to decode the audio frames may be stored at the memory 144, such as the pre-redundancy buffer 150, and may be retrieved if a packet error occurs. As described with reference to FIG. 1, the packets may be received in a particular order at fixed intervals. However, due to network conditions at the circuit-switched network 154, one or more of the packets sent by the media gateway 120 may be corrupted or may not arrive at all. For example, the second device 140 may receive the modified (N+1)th packet 170 during an Nth time slot 440. In a particular implementation, the modified packet 170 is received from the media gateway 120 during the Nth time slot 440 in response to an error associated with receipt of primary coding of the Nth audio frame at the media gateway 120, as described with reference to FIG. 2. The second device 140 may also receive a modified (N+1)th packet 402 during an (N+1)th time slot 442. Due to a network error, a modified (N+2)th packet 410 may not be correctly received during an (N+2)th time slot 444.

In a particular implementation, each of the packets of the packet sequence includes coding of multiple audio frames. For example, the modified (N+2)th packet 170 includes the primary coding 162 of the (N+2)th audio frame and the redundant coding 164 of the Nth audio frame, the modified (N+1)th packet 402 includes the primary coding 404 of the (N+1)th audio frame and the redundant coding 406 of the (N−1)th audio frame, and the modified (N+2)th packet 410 includes the primary coding 162 of the (N+2)th audio frame and the redundant coding 164 of the Nth audio frame. Alternatively, one or more packets may include coding of a single audio frame (e.g., primary coding of a single audio frame). One or more bits may be included in the redundant coding 164, 406 of the modified packets 170, 402, and 410 to indicate signaling information 172, 408, and 412, respectively. The signaling information 172, 408, and 412 may specify which audio frame is to be decoded in the corresponding modified packet. For example, the signaling information 172 may indicate that the redundant coding 164 of the Nth audio frame is to be decoded, the signaling information 408 may indicate that the primary coding 404 of the (N+1)th audio frame is to be decoded, and the signaling information 412 may indicate that the primary coding 162 of the (N+2)th audio frame is to be decoded. For ease of illustration, additional packets of the packet sequence, such as a modified (N−1)th packet, a modified (N+3)th packet, etc., are not shown in FIG. 4.

The second device 140 may decode the received packets to generate audio frames for playback at the second device 140. For example, the second device 140 may decode the redundant coding 164 of the Nth audio frame based on the signaling information 172 to generate the Nth audio frame 420 for playback at the second device 140. Additionally, the second device 140 may store a copy 430 of the primary coding 162 of the (N+2)th audio frame (e.g., the unused portion of the modified packet 170) in the pre-redundancy buffer 150. To further illustrate, the second device 140 may decode the primary coding 404 of the (N+1)th audio frame to generate the (N+1)th audio frame 422 for playback at the second device 140, and the second device 140 may store a copy 432 of the redundant coding 406 of the (N−1)th audio frame (e.g., the unused portion of the modified packet 402) in the pre-redundancy buffer 150. Alternatively, because an (N−1)th time slot has passed, the second device 140 may discard the (N−1)th audio frame.

In the example illustrated in FIG. 4, the (N+2)th packet 410 is unavailable for decoding. The second device 140 may determine that an error is associated with the (N+2)th time slot 444. For example, the second device 140 may determine that the modified (N+2)th packet 410 (or a portion thereof) is corrupt. As another example, the second device 140 may determine that the modified (N+2)th packet 410 has not been received. Based on a determination that the modified (N+2)th packet 410 is unavailable (either due to corruption or not being received), the second device 140 may check whether a copy of unused frame information for the (N+2)th audio frame is available in the pre-redundancy buffer 150. For example, the second device 140 may check each packet in the pre-redundancy buffer 150, and based on an identifier (e.g., a sequence identifier, a timestamp, etc.) and an offset value, the second device 140 may determine whether a copy of coding of the (N+2)th packet is available.

As illustrated in FIG. 4, the pre-redundancy buffer 150 stores the copy 430 of the primary coding 162 of the (N+2)th audio frame. The second device 140 may retrieve the copy 430 of the primary coding 162 from the pre-redundancy buffer 150 and may generate the (N+2)th audio frame 424 for playback at the second device 140 based on the copy 430. Thus, the copy 430 of the primary coding 162 may enable the second device 140 to compensate for (or conceal) an error in the circuit-switched network 154. If a copy of the (N+2)th audio frame is not available in the pre-redundancy buffer 150, the second device 140 may perform a different error concealment operation.

Thus, FIG. 4 illustrates how the second device 140 is able to use copies of unused portions of audio frames stored in the pre-redundancy buffer 150 to generate a particular audio frame when a packet containing primary coding of a particular audio frame is unavailable. Generating the particular audio frame for playback at the second device 140 based on the stored copy may compensate for (or conceal) a network error in the circuit-switched network 154.

Figure 5:
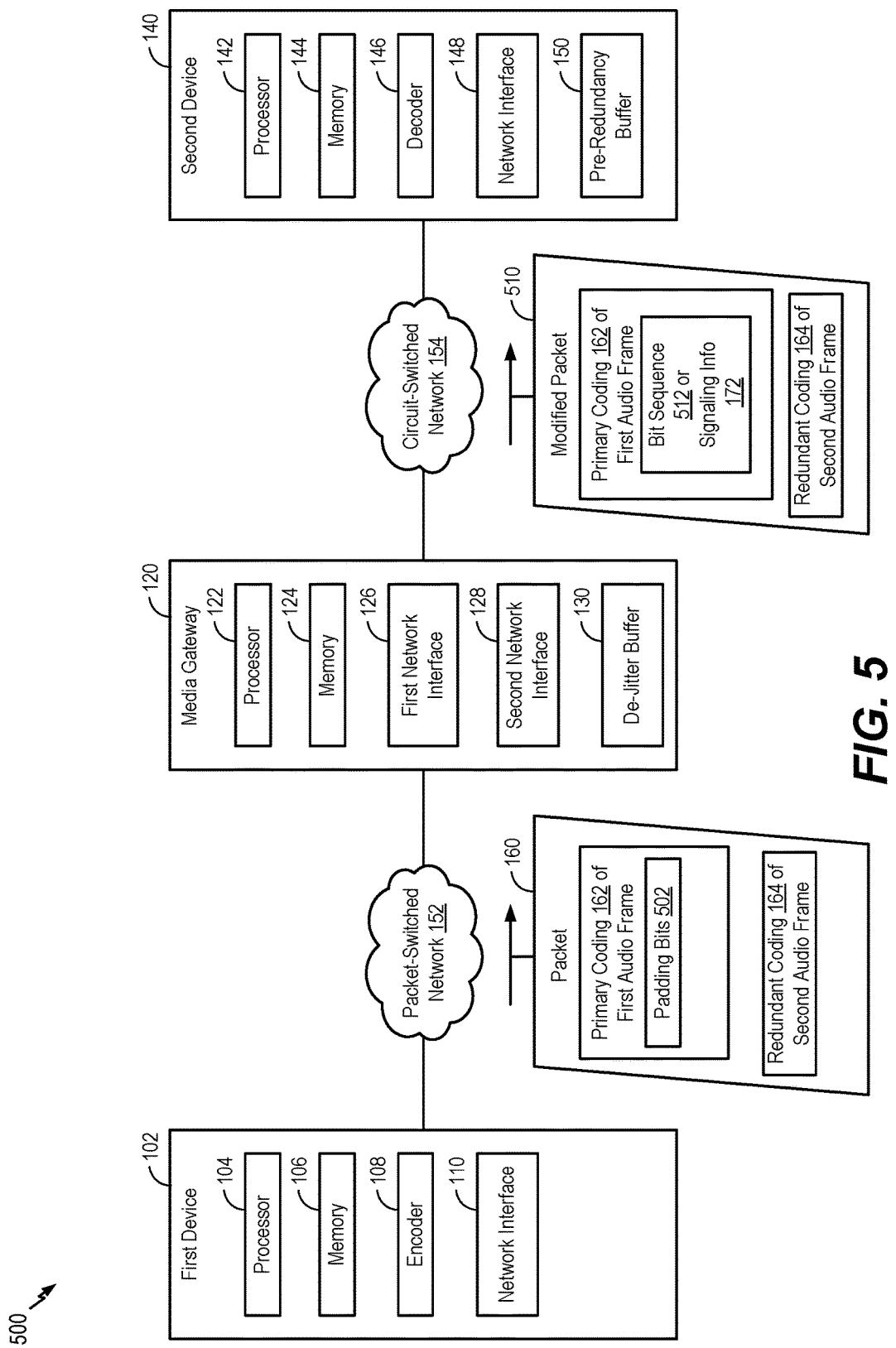
FIG. 5 is a block diagram of a particular implementation of a system configured to communicate redundant frame information using a bit sequence (or other signaling information)

Referring to FIG. 5, a particular illustrative example of a system configured to communicate redundant frame information using a bit sequence is shown and generally designated 500. In a particular implementation, the system 500 includes the first device 102, the media gateway 120, and the second device 140 of FIG. 1. The first device 102 may perform data communications with the media gateway 120 via the packet-switched network 152, and the media gateway 120 may perform data communications with the second device 140 via the circuit-switched network 154.

During operation, the first device 102 may encode and transmit a sequence of packets, including the packet 160, to the media gateway 120 via the packet-switched network 152. The packet 160 may include the primary coding 162 of the first audio frame (e.g., the (N+2)th audio frame) and the redundant coding 164 of the second audio frame (e.g., the Nth audio frame). The primary coding 162 may include an encoded low-band core of the first audio frame and high-band parameters of the first audio frame, and the redundant coding 164 includes a gain shape indicator associated with a high-band gain shape of the second audio frame, a high-band gain frame indicator associated with a high-band gain frame of the second audio frame, a high-band LSP indicator associated with high-band LSPs of the second audio frame, or a combination thereof, as described with reference to FIGS. 1 and 3.

The primary coding 162 may include one or more padding bits 502. The one or more padding bits 502 may be added to the packet 160 (or to a specific portion thereof) so that the packet 160 (and/or the specific portion thereof) maintains a particular size. For example, 11.6 kps of a total 13.2 kps may be reserved for the primary coding 162, but the primary coding 162 may not be large enough to occupy the full 11.6 kps. To ensure that the primary coding 162 has the fixed size of 11.6 kps, the one or more padding bits 502 may be added to the primary coding 162 such that the combination of the primary coding 162 and the one or more padding bits 502 occupies the full 11.6 kps. Additionally or alternatively, padding bits may be added to the redundant coding 164. In another particular implementation, the one or more padding bits 502 may be distinct from the primary coding 162 and the redundant coding 164 (e.g., so that the packet 160 as a whole, or at least a data/payload portion thereof, occupies the full 13.2 kps). The one or more padding bits 502 may have a particular value, such as all zero values or all one values, that indicates that the one or more padding bits 502 are to be discarded during decoding.

The media gateway 120 may buffer received packets (e.g., audio frames) in the de-jitter buffer 130. The media gateway 120 may transmit modified packets to the second device 140 via the circuit-switched network 154 at a fixed interval. If the media gateway 120 determines that a packet including a particular audio frame is unavailable for transmission at a time slot associated with the particular audio frame, the media gateway 120 may attempt to generate a modified packet for transmission during the time slot. For example, if the media gateway 120 determines that a packet including primary coding of the second audio frame is unavailable, the media gateway 120 generates a modified packet 510.

As compared to the modified packet 170 of FIG. 1, the modified packet 510 of FIG. 5 includes a bit sequence 512 (or the signaling information 172). To illustrate, the processor 122 may be configured to generate the modified packet 510 by replacing at least a portion of the padding bits 502 of the primary coding 162 with the bit sequence 512 (or with the signaling information 172). The bit sequence 512 (or the signaling information 172) may indicate that the redundant coding 164 is to be decoded. The bit sequence 512 may include a predetermined sequence of bit values. The predetermined sequence of bit values may be defined by a wireless communication standard (e.g., an EVS standard, such as a 3rd Generation Partnership Project (3GPP) EVS standard), may be defined by a vendor or manufacturer of the first device 102 and the second device 140, may be negotiated by the devices 102 and 140, or may be some other value. In a particular implementation, the bit sequence 512 includes all one values. Alternatively, the bit sequence 512 includes all zero values. As another example, the bit sequence 512 may include at least one non-zero value. In other implementations, the bit sequence 512 includes other values. In a particular implementation, the bit sequence 512 does not replace an entirety of the padding bits 502 of the primary coding 162, such that a portion of the padding bits 502 remains in the modified packet 510 along with the redundant coding 164 of the second audio frame (e.g., the Nth audio frame). Alternatively, the bit sequence 512 may replace an entirety of the padding bits 502 of the primary coding 162. In another implementation, the padding bits 502 may be entirely or partially replaced by other signaling information, such as the signaling information 172 described with reference to FIG. 1 and Table 1.

In a particular implementation, the packet 160 and the modified packet 510 may include one or more bits (e.g., the one or more bits 166 of FIG. 1) in the respective redundant coding, which are not illustrated for convenience. The one or more bits may include offset bits (e.g., FEC offset bits) or other bits related to decoding the first audio frame or the second audio frame. The packet 160 and the modified packet 510 may also include one or more bits that are not related to decoding the first audio frame and the second audio frame, such as CMR bits as a non-limiting example.

The processor 122 may be configured to generate the modified packet 510 in response to a determination that a second packet (e.g., an (N+2)th packet) including primary coding of the second audio frame is unavailable. As an example, the determination that the second packet is unavailable may be based on a determination that the second packet (or a portion thereof) is corrupt. As another example, the determination that the second packet is unavailable may be based on a determination that the second packet has not been received (e.g., is not available in the de jitter buffer 130).

After generating the modified packet 510, the media gateway 120 may transmit the modified packet 510 to the second device 140 during a time slot associated with the second audio frame. The second device 140 may receive the modified packet 510 and decode a portion of the modified packet 510 based on the bit sequence 512 (or the signaling information 172) to generate the second audio frame (e.g., the Nth audio frame) for playback at the second device 140. In a particular implementation, the processor 142 is configured to detect the bit sequence 512 (or the signaling information 172) within a portion of the padding bits 502 of the primary coding 162. In some implementations, the second device 140 may store the primary coding 162 in the pre-redundancy buffer 150. If an error occurs during a time slot associated with the first audio frame (e.g., the (N+2)th audio frame), the second device 140 may retrieve the primary coding 162 from the pre-redundancy buffer 150 to generate the first audio frame (e.g., the (N+2)th audio frame) for playback, as further described with reference to FIGS. 1 and 4.

In an alternate implementation, the media gateway 120 may modify the entire redundant coding 164 (e.g., to all zero values, to all one values, to alternate one values and zero values, or to some other unique bit sequence that is not generated by a CODEC during generation of redundant coding) of the packet 160 to signal that the primary coding 162 of the modified packet 510 is to be decoded at the second device 140. For example, if the Nth packet is available (e.g., in the de jitter buffer 130), then the media gateway 120 may send a modified Nth packet by modifying the entire redundant coding in the Nth packet to indicate that the primary coding in the modified Nth packet is to be decoded at a time slot corresponding to N at the second device 140. The second device 140 (e.g., the processor 122) may identify this modification in the redundant coding of the modified Nth packet and determine that the primary coding of the modified Nth packet is to be decoded. In another example, if the Nth packet is not available and a future packet (e.g., the (N+2)th packet 160 that contains the redundant coding 164 of the second audio frame) is available in the de-jitter buffer 130, then the media gateway 120 may send the unmodified (N+2)th packet 160 to the second device 140 via the circuit-switched network 154. The second device 140 (e.g., the processor 142) may determine that the redundant coding 164 has not been modified, and based on this determination, the second device 140 may decode the redundant coding 164. The received unmodified (N+2)th packet 160 may be stored in the pre-redundancy buffer 150 for use in pre-redundancy decoding if a corresponding packet is not received during the (N+2)th time slot at the second device 140, as described with reference to FIGS. 1 and 4.

The system 500 of FIG. 5 enables the media gateway 120 to use redundant frame information to provide modified packets with bit sequences to a circuit-switched network device (e.g., the second device 140). The bit sequence 512 (or the signaling information 172) indicates to the second device 140 which portion of the modified packet 510 is to be decoded. Thus, a packet having redundant coding of a particular audio frame may be provided to the second device 140 if a packet having primary coding is unavailable, and the redundant coding may be used by the second device 140 to compensate for (or conceal) network errors in the packet-switched network 152. The second device 140 may also store copies of unused portions of packets in the pre-redundancy buffer 150 for use in compensating for (or concealing) network errors in the circuit-switched network 154, as further described with reference to FIG. 1.

In the above description, various functions performed by the system 500 of FIG. 5 are described as being performed by certain components. However, this division of components is for illustration only. In an alternate implementation, a function performed by a particular component may instead be divided amongst multiple components. Moreover, in an alternate implementation, two or more components of FIG. 5 may be integrated into a single component. Each component illustrated in FIG. 5 may be implemented using hardware (e.g., a FPGA device, an ASIC, a DSP, a controller, etc.), software (e.g., instructions executable by a processor), or a combination thereof.

Figure 6:
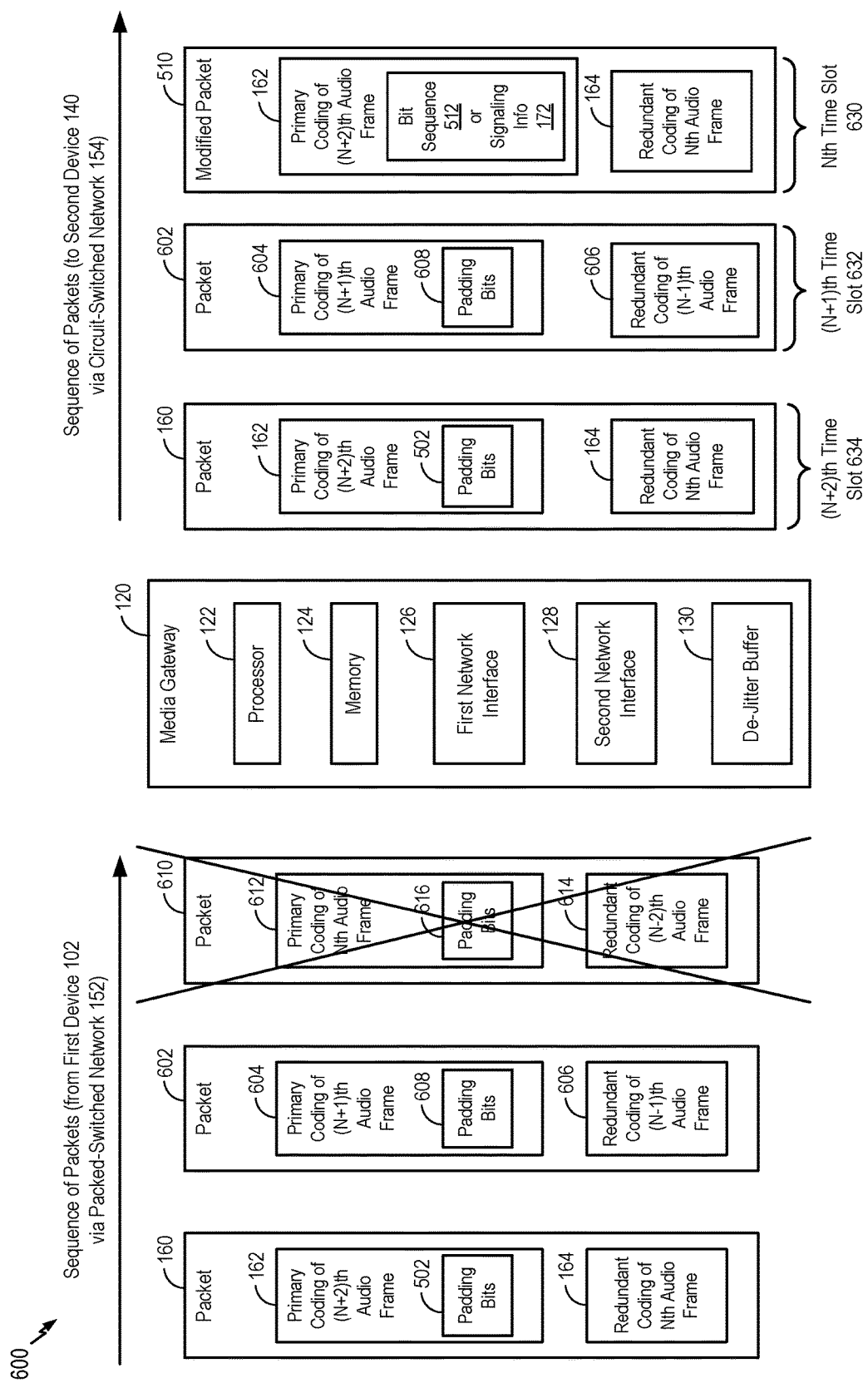
FIG. 6 is a diagram of an example of modifying a sequence of packets at a media gateway to include a bit sequence (or other signaling information)

Referring to FIG. 6, a diagram of a particular implementation modifying a sequence of packets at a media gateway to include a bit sequence is shown and generally designated 600. The media gateway may include or correspond to the media gateway 120 of FIG. 5.

As packets are received by the first network interface 126, the packets (e.g., the audio frames) may be stored in the de-jitter buffer 130. As described with reference to FIG. 5, due to network conditions at the packet-switched network 152, the packets sent by a source device (e.g., the first device 102) may arrive out of order, may be corrupted, or may not arrive at all. The media gateway 120 (e.g., the processor 122) may retrieve packets (e.g., audio frames) from the de-jitter buffer 130 according to a packet sequence or a frame sequence. For example, the packets may be retrieved based on sequence numbers, timestamps, or other sequencing information included in the packets. To illustrate, the media gateway 120 may attempt to retrieve an Nth packet 610 prior to an (N+1)th packet 602, and the media gateway 120 may attempt to retrieve the (N+1)th packet 602 prior to the (N+2)th packet 160.

In a particular implementation, each of the packets of the packet sequence includes coding of multiple audio frames. For example, the Nth packet 610 includes primary coding 612 of the Nth audio frame and redundant coding 614 of the (N−2)th audio frame, the (N+1)th packet 602 includes primary coding 604 of the (N+1)th audio frame and redundant coding 606 of the (N−1)th audio frame, and the (N+2)th packet 160 includes primary coding 162 of the (N+2)th audio frame and redundant coding 164 of the Nth audio frame. Alternatively, one or more packets may include coding of a single audio frame (e.g., primary coding of a single audio frame). The primary coding 162 may include the padding bits 502, the primary coding 604 may include the padding bits 608, and the primary coding 612 may include the padding bits 616. In some implementations, the packets 610, 602, and 160 may also include respective bits (e.g., offset bits) related to one or more of the audio frames of the corresponding packet. For ease of illustration, additional packets of the packet sequence, such as an (N−1)th packet, an (N+3)th packet, etc., are not shown in FIG. 6.

The media gateway 120 may provide packets, modified packets, or both, to the second device 140 via the circuit-switched network 154 at fixed intervals. For example, the media gateway may provide a packet corresponding to the Nth audio frame during an Nth time slot 630, a packet corresponding to the (N+1)th audio frame during an (N+1)th time slot 632, and a packet corresponding to the (N+2)th audio frame during an (N+2)th time slot 634. The media gateway 120 may determine whether to modify a packet or to forward a packet without modification based on whether a corresponding packet has been received from the first device 102 without errors.

In the example illustrated in FIG. 6, the Nth packet 610 is unavailable for use in generating a modified packet. For example, the media gateway 120 may determine that the Nth packet 610 is not available in the de-jitter buffer 130 (e.g., that the Nth packet 610 has not been received). As another example, the media gateway 120 may determine that the Nth packet 610 is in the de-jitter buffer 130, but an error may occur during decoding of the Nth packet 610 (e.g., the Nth packet 610, or a portion thereof, is corrupt). Based on a determination that the Nth packet 610 is unavailable (either due to corruption or not being received), the media gateway 120 may check whether redundant frame information for the Nth audio frame is available in the de-jitter buffer 130. For example, the media gateway 120 may check each packet in the de-jitter buffer 130, and based on an identifier (e.g., a sequence identifier, a timestamp, etc.) and an offset value, the media gateway 120 may determine whether redundant information of the Nth audio frame is available.

As illustrated in FIG. 6, the (N+2)th packet 160 includes the redundant coding 164 of the Nth audio frame. The media gateway 120 may generate the modified packet 510 by modifying the (N+2)th packet 160 to include the bit sequence 512 (or other signaling information, such as the signaling information 172) that indicates that the redundant coding 164 is to be decoded. The bit sequence may replace a portion of (or an entirety of) the padding bits 502 of the primary coding 162 of the (N+2)th audio frame. After generating the modified packet 510, the media gateway 120 may transmit the modified packet 510 to the second device 140 during the Nth time slot 630. The second device 140 may receive the modified packet 510 with the bit sequence 512 (or the signaling information 172), detect the bit sequence 512 (or the signaling information 172) in the padding bits 502, decode the redundant coding 164 of the Nth audio frame based on the detection of the bit sequence 512, and generate the Nth audio frame for playback at the second device 140. Thus, the modified packet 510 with the bit sequence 512 may enable the second device 140 to compensate for (or conceal) an error in the packet-switched network 152. If the packet 160 including the redundant coding 164 of the Nth audio frame is not available in the de-jitter buffer 130, the media gateway 120 may perform a different error concealment operation.

If a corresponding packet is received without error at the media gateway 120, the media gateway 120 may forward the packet to the second device 140. For example, the media gateway 120 may receive the (N+1)th packet 602 without error and may transmit the packet 602 to the second device 140 during the (N+1)th time slot 632. As another example, the media gateway 120 may receive the (N+2)th packet 160 without error and may transmit the packet 160 to the second device 140 during the (N+2)th time slot 634. In a particular implementation, the packets 602 and 160 may be forwarded without modification, and the second device 140 may be configured to decode the corresponding primary coding based on the absence of the bit sequence 512 (or the signaling information 172). Alternatively, the packets 602 and 160 may include a second bit sequence that is distinct from the bit sequence 512 (or other signaling information, such as the signaling information 172) to indicate that the primary coding in each of the packets 602 and 160 is to be decoded.

Thus, FIG. 6 illustrates how the media gateway 120 is able to use redundant coding of audio frames stored in the de-jitter buffer 130 to provide a modified frame when a packet including primary coding of a particular audio frame is unavailable. Providing the modified frame with a bit sequence indicating that the redundant coding of the particular audio frame is to be decoded enables the second device 140 to generate the particular audio frame for playback at the second device 140 and may compensate for (or conceal) a network error in the packet-switched network 152.

Figure 7:
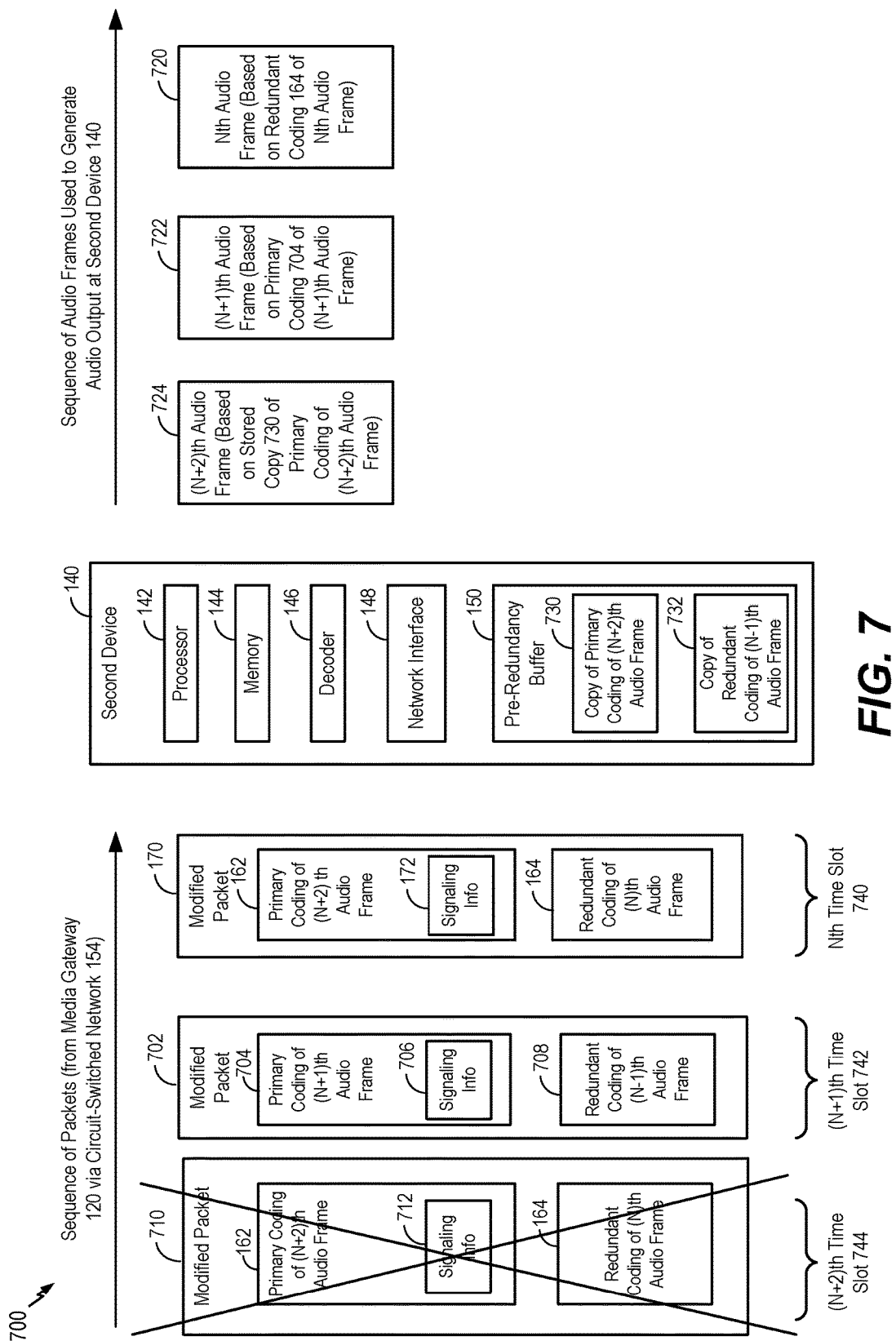
FIG. 7 is a diagram of a second implementation of retrieving unused frame information to generate audio frames.

Referring to FIG. 7, a diagram of a second implementation of retrieving unused frame information to generate audio frames is shown and generally designated 700. The unused frame information may be stored at a memory of a destination device in a circuit-switched network. The destination device may include or correspond to the second device 140 in the circuit-switched network 154 of FIG. 1.

As packets are received by the network interface 148, the packets may be decoded and a portion of the packets may be used to generate audio frames for playback at the second device 140. The portion that is not used to decode the audio frames may be stored at the memory 144, such as the pre-redundancy buffer 150, and may be retrieved if a packet error occurs. As described with reference to FIG. 1, the packets may be received in a particular order at fixed intervals. However, due to network conditions at the circuit-switched network 154, one or more of the packets sent by the media gateway 120 may be corrupted or may not arrive at all. For example, the second device 140 may receive the modified (N+2)th packet 170 during an Nth time slot 740. In a particular implementation, the modified packet 170 is received from the media gateway 120 during the Nth time slot 740 in response to an error associated with receipt of primary coding of the Nth audio frame at the media gateway 120, as described with reference to FIG. 2. The second device 140 may also receive a modified (N+1)th packet 702 during an (N+1)th time slot 742. Due to a network error, a modified (N+2)th packet 710 may not be correctly received during an (N+2)th time slot 744.

In a particular implementation, each of the packets of the packet sequence includes coding of multiple audio frames. For example, the modified (N+2)th packet 170 includes the primary coding 162 of the (N+2)th audio frame and the redundant coding 164 of the Nth audio frame, the modified (N+1)th packet 702 includes the primary coding 704 of the (N+1)th audio frame and the redundant coding 708 of the (N−1)th audio frame, and the modified (N+2)th packet 710 includes the primary coding 162 of the (N+2)th audio frame and the redundant coding 164 of the Nth audio frame. Alternatively, one or more packets may include coding of a single audio frame (e.g., primary coding of a single audio frame). One or more bits may be included in the primary coding 162, 704 of the modified packets 170, 702, and 710 to indicate signaling information 172, 706, and 712, respectively. The signaling information 172, 706, and 712 may specify which audio frame is to be decoded in the corresponding modified packet. For example, the signaling information 172 may indicate that redundant coding 164 of the (N)th audio frame is to be decoded, the signaling information 708 may indicate that the primary coding 704 of the (N+1)th audio frame is to be decoded, and the signaling information 712 may indicate that the primary coding 162 of the (N+2)th audio frame is to be decoded. For ease of illustration, additional packets of the packet sequence, such as a modified (N−1)th packet, a modified (N+3)th packet, etc., are not shown in FIG. 7.

The second device 140 may decode the received packets to generate audio frames for playback at the second device 140. For example, the second device 140 may decode the redundant coding 164 of the Nth audio frame based on the signaling information 172 to generate the Nth audio frame 720 for playback at the second device 140. Additionally, the second device 140 may store a copy 730 of the primary coding 162 of the (N+2)th audio frame (e.g., the unused portion of the modified packet 170) in the pre-redundancy buffer 150. To further illustrate, the second device 140 may decode the primary coding 704 of the (N+1)th audio frame to generate the (N+1)th audio frame 722 for playback at the second device 140, and the second device 140 may store a copy 732 of the redundant coding 708 of the (N−1)th audio frame (e.g., the unused portion of the modified packet 702) in the pre-redundancy buffer 150. Alternatively, because an (N−1)th time slot has passed, the second device 140 may discard the (N−1)th audio frame.

In the example illustrated in FIG. 7, the (N+2)th packet 710 is unavailable for decoding. The second device 140 may determine that an error is associated with the (N+2)th time slot 744. For example, the second device 140 may determine that the modified (N+2)th packet 710 (or a portion thereof) is corrupt. As another example, the second device 140 may determine that the modified (N+2)th packet 710 has not been received. Based on a determination that the modified (N+2)th packet 710 is unavailable (either due to corruption or not being received), the second device 140 may check whether a copy of unused frame information for the (N+2)th audio frame is available in the pre-redundancy buffer 150. For example, the second device 140 may check each packet in the pre-redundancy buffer 150, and based on an identifier (e.g., a sequence identifier, a timestamp, etc.) and an offset value, the second device 140 may determine whether a copy of coding of the (N+2)th packet is available.

As illustrated in FIG. 7, the pre-redundancy buffer 150 stores the copy 730 of the primary coding 162 of the (N+2)th audio frame. The second device 140 may retrieve the copy 730 of the primary coding 162 from the pre-redundancy buffer 150 and may generate the (N+2)th audio frame 724 for playback at the second device 140 based on the copy 730. Thus, the copy 730 of the primary coding 162 may enable the second device 140 to compensate for (or conceal) an error in the circuit-switched network 154. If a copy of the (N+2)th audio frame is not available in the pre-redundancy buffer 150, the second device 140 may perform a different error concealment operation.

Thus, FIG. 7 illustrates how the second device 140 is able to use copies of unused portions of audio frames stored in the pre-redundancy buffer 150 to generate a particular audio frame when a packet containing primary coding of a particular audio frame is unavailable. Generating the particular audio frame for playback at the second device 140 based on the stored copy may compensate for (or conceal) a network error in the circuit-switched network 154.

Figure 8:
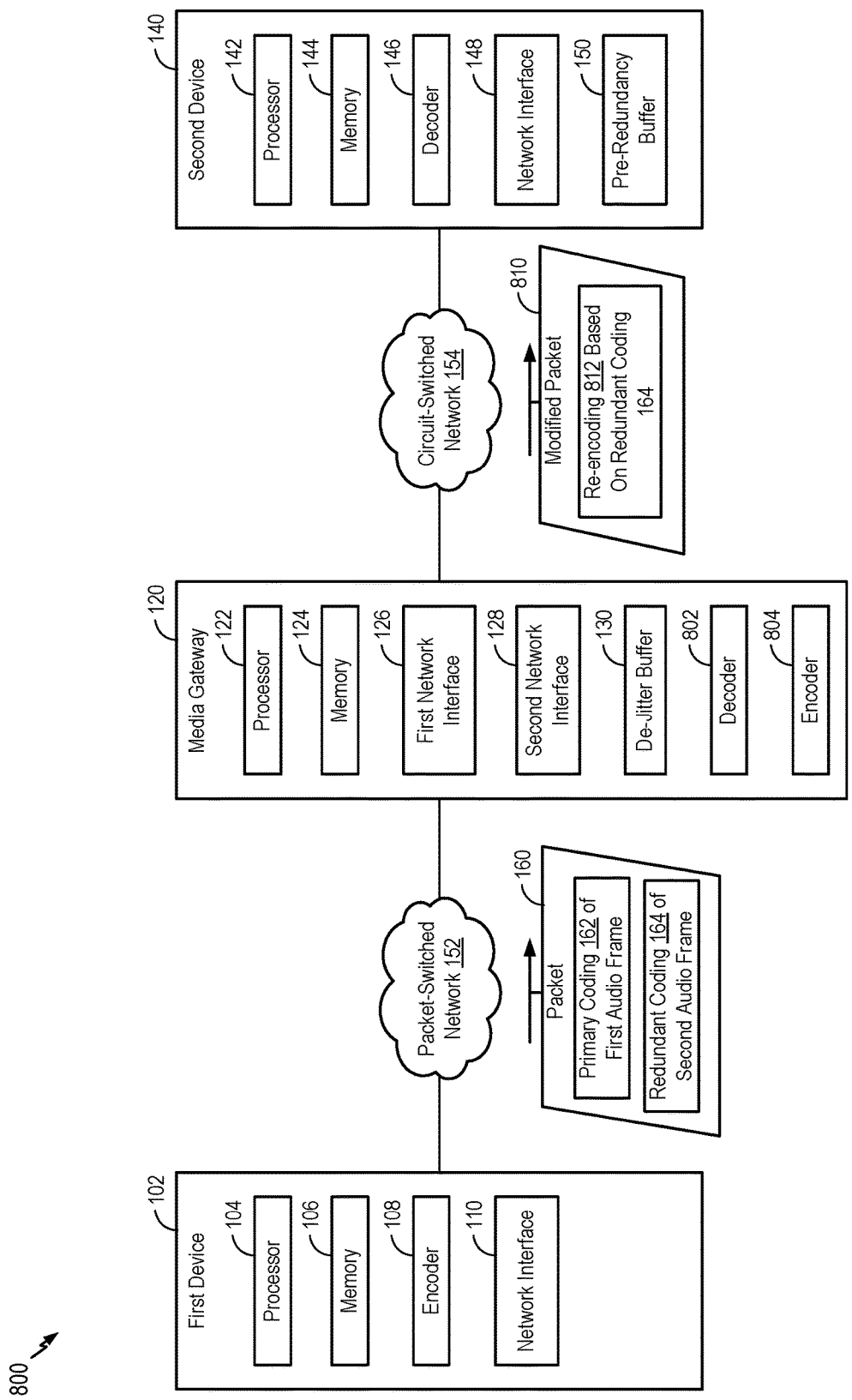
FIG. 8 is a block diagram of a particular implementation of a system configured to use redundant frame information to communicate packets from a packet-switched network to a circuit-switched network.

Referring to FIG. 8 a particular illustrative example of a system configured to use redundant frame information to communicate packets from a packet-switched network to a circuit-switched network is shown and generally designated 800. In a particular implementation, the system 800 includes the first device 102, the media gateway 120, and the second device 140 of FIG. 1. The first device 102 may perform data communications with the media gateway 120 via the packet-switched network 152, and the media gateway 120 may perform data communications with the second device 140 via the circuit-switched network 154.

As illustrated in FIG. 8, the media gateway 120 includes a decoder 802 and an encoder 804. In a particular implementation, the decoder 802 and the encoder 804 may be part of a vocoder (a voice encoder-decoder) that is configured to perform encoding and decoding operations. The decoder 802 may be configured to decode one or more of the packets to generate the corresponding audio frames, and the encoder 804 may be configured to re-encode one or more of the audio frames into re-encodings that are included in modified packets. Decoding the packet to generate a particular audio frame and then encoding the particular audio frame may be referred to as "transcoding" the particular audio frame. In a particular implementation, the decoder 802 and the encoder 804 may be used to decode redundant coding of a particular audio frame and to re-encode the particular audio frame as primary coding. In other implementations, other types of decoding and encoding may be performed.

During operation, the first device 102 may encode and transmit a sequence of packets, including the packet 160, to the media gateway 120 via the packet-switched network 152. The packet 160 may include the primary coding 162 of the first audio frame (e.g., the (N+2)th audio frame) and the redundant coding 164 of the second audio frame (e.g., the Nth audio frame). The primary coding 162 may include an encoded low-band core of the first audio frame and high-band parameters of the first audio frame, and the redundant coding 164 includes a gain shape indicator associated with a high-band gain shape of the second audio frame, a high-band gain frame indicator associated with a high-band gain frame of the second audio frame, a high-band LSP indicator associated with high-band LSPs of the second audio frame, or a combination thereof, as described with reference to FIGS. 1 and 3. The media gateway 120 may buffer received packets (e.g., audio frames) in the de jitter buffer 130. The media gateway 120 may transmit packets to the second device 140 via the circuit-switched network 154 at a fixed interval. If the media gateway 120 determines that a packet including a particular audio frame is unavailable for transmission at a time slot associated with the particular audio frame, the media gateway 120 may attempt to generate a modified packet for transmission during the time slot. For example, if the media gateway 120 determines that a packet including primary coding of the second audio frame is unavailable, the media gateway 120 may generate a modified packet 810.

The modified packet 810 of FIG. 8 includes a re-encoding 812 based on the redundant coding 164. To illustrate, the decoder 802 may decode the packet 160 to generate the second audio frame based on the redundant coding 164 of the second audio frame, the encoder 804 may encode the second audio frame to generate the re-encoding 812, and the processor 122 may be configured to generate the modified packet 810 that includes the re-encoding 812 of the second audio frame. In a particular implementation, the re-encoding 812 is a primary coding of the decoded redundant coding 164 of the second audio frame. Because a single audio frame is included in the modified packet 810, the modified packet 810 may not include one or more bits that indicate signaling information to specify which portion of the modified packet 810 to decode.

In a particular implementation, the packet 160, the modified packet 810, or both, may include one or more bits (e.g., the one or more bits 166 of FIG. 1) of the respective redundant coding, which are not illustrated for convenience. The one or more bits may include offset bits (e.g., FEC offset bits) or other bits related to the first audio frame or the second audio frame. The packet 160 and the modified packet 810 may also include one or more bits that are not related to decoding the first audio frame and the second audio frame, such as CMR bits as a non-limiting example.

The processor 122 may be configured to generate the modified packet 810 in response to a determination that a second packet (e.g., an (N+2)th packet) including primary coding of the second audio frame is unavailable. As an example, the determination that the second packet is unavailable may be based on a determination that the second packet (or a portion thereof) is corrupt. As another example, the determination that the second packet is unavailable may be based on a determination that the second packet has not been received (e.g., is not available in the de jitter buffer 130).

After generating the modified packet 810, the media gateway 120 may transmit the modified packet 810 to the second device 140 during a time slot associated with the second audio frame. The second device 140 may receive the modified packet 810 and decode the modified packet 810 to generate the second audio frame (e.g., the Nth audio frame) for playback at the second device 140.

The system 800 of FIG. 8 enables the media gateway 120 to use redundant frame information to provide modified packets with re-encodings of the redundant frame information to a circuit-switched network device (e.g., the second device 140). The re-encoding is decoded and used to generate a particular audio frame. Thus, a packet having a re-encoding of the particular audio frame may be provided to the second device 140 if a packet having primary coding is unavailable, and the re-encoding of the particular audio frame may be used by the second device 140 to compensate for (or conceal) network errors in the packet-switched network 152.

In the above description, various functions performed by the system 800 of FIG. 8 are described as being performed by certain components. However, this division of components is for illustration only. In an alternate implementation, a function performed by a particular component may instead be divided amongst multiple components. Moreover, in an alternate implementation, two or more components of FIG. 8 may be integrated into a single component. Each component illustrated in FIG. 8 may be implemented using hardware (e.g., a FPGA device, an ASIC, a DSP, a controller, etc.), software (e.g., instructions executable by a processor), or a combination thereof.

Figure 9:
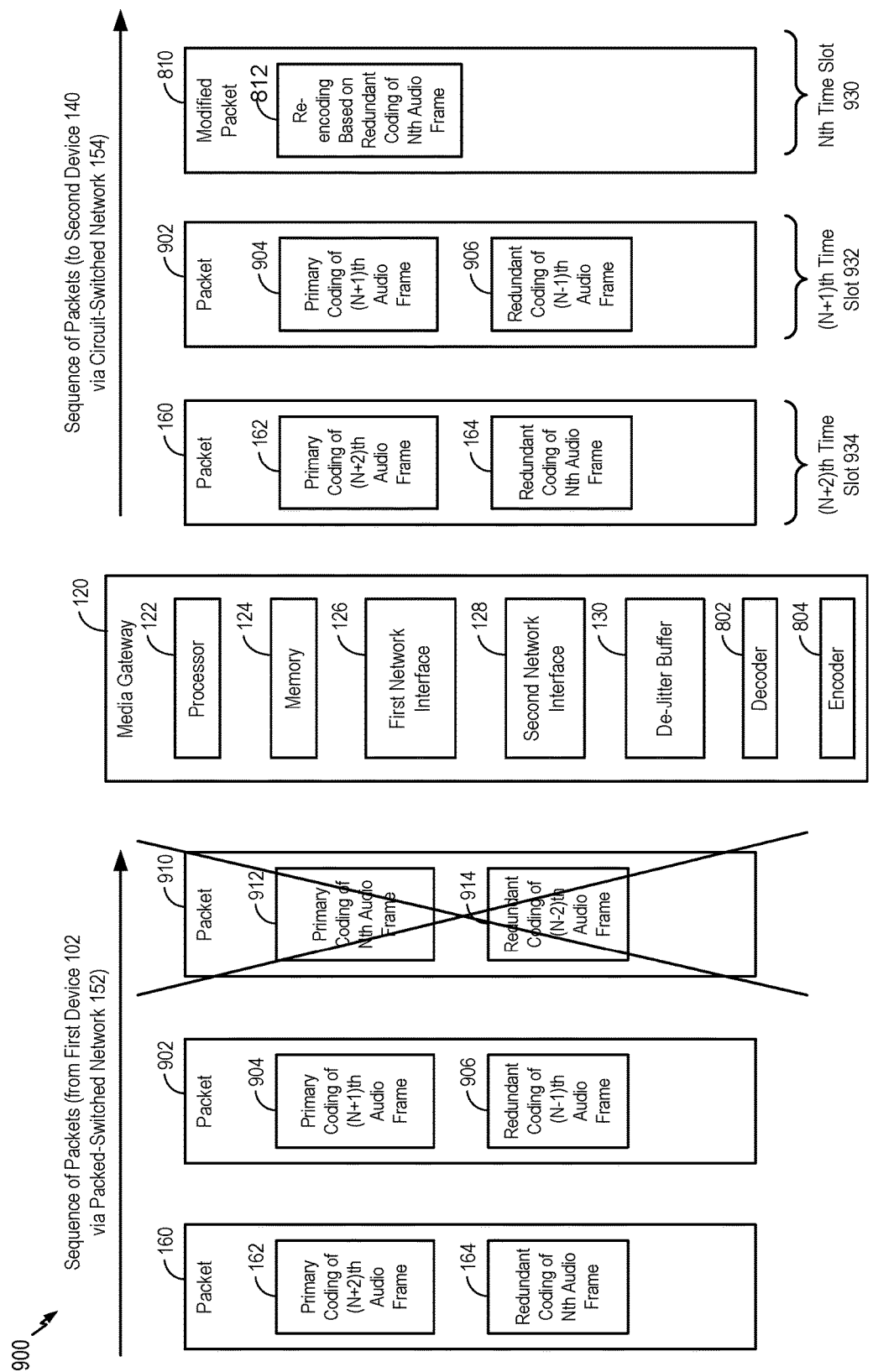
FIG. 9 is a diagram of an example of generating packets based on redundant frame information in packets received from a packet-switched network.

Referring to FIG. 9, a diagram of a particular implementation of generating packets based on redundant frame information in packets received from a packet-switched network is shown and generally designated 900. The packets may be generated at a media gateway. The media gateway may include or correspond to the media gateway 120 of FIG. 8.

As packets are received by the first network interface 126, the packets (e.g., the audio frames) may be stored in the de-jitter buffer 130. As described with reference to FIG. 8, due to network conditions at the packet-switched network 152, the packets sent by a source device (e.g., the first device 102) may arrive out of order, may be corrupted, or may not arrive at all. The media gateway 120 (e.g., the processor 122) may retrieve packets (e.g., audio frames) from the de-jitter buffer 130 according to a packet sequence or a frame sequence. For example, the packets may be retrieved based on sequence numbers, timestamps, or other sequencing information included in the packets. To illustrate, the media gateway 120 may attempt to retrieve an Nth packet 910 prior to an (N+1)th packet 902, and the media gateway 120 may attempt to retrieve the (N+1)th packet 902 prior to the (N+2)th packet 160.

In a particular implementation, each of the packets of the packet sequence includes coding of multiple audio frames. For example, the Nth packet 910 includes primary coding 912 of the Nth audio frame and redundant coding 914 of the (N−2)th audio frame, the (N+1)th packet 902 includes primary coding 904 of the (N+1)th audio frame and redundant coding 906 of the (N−1)th audio frame, and the (N+2)th packet 160 includes primary coding 162 of the (N+2)th audio frame and redundant coding 164 of the Nth audio frame. Alternatively, one or more packets may include coding of a single audio frame (e.g., primary coding of a single audio frame). The packets 910, 902, and 160 may also include respective bits (e.g., offset bits) that are related to the audio frames included in the corresponding packet. For ease of illustration, additional packets of the packet sequence, such as an (N−1)th packet, an (N+3)th packet, etc., are not shown in FIG. 9.

The media gateway 120 may provide packets, modified packets, or both, to the second device 140 via the circuit-switched network 154 at fixed intervals. For example, the media gateway 120 may provide a packet corresponding to the Nth audio frame during an Nth time slot 930, a packet corresponding to the (N+1)th audio frame during an (N+1)th time slot 932, and a packet corresponding to the (N+2)th audio frame during an (N+2)th time slot 934. The media gateway 120 may determine whether to forward a packet or to modify a packet based on whether a corresponding packet has been received from the first device 102 without errors.

In the example illustrated in FIG. 9, the Nth packet 910 is unavailable for use in generating a modified packet. For example, the media gateway 120 may determine that the Nth packet 910 is not available in the de-jitter buffer 130 (e.g., that the Nth packet 910 has not been received). As another example, the media gateway 120 may determine that the Nth packet 910 is in the de-jitter buffer 130, but an error may occur during decoding of the Nth packet 910 (e.g., the Nth packet 210, or a portion thereof, is corrupt). Based on a determination that the Nth packet 910 is unavailable (either due to corruption or not being received), the media gateway 120 may check whether redundant frame information for the Nth audio frame is available in the de-jitter buffer 130. For example, the media gateway 120 may check each packet in the de-jitter buffer 130, and based on an identifier (e.g., a sequence identifier, a timestamp, etc.) and an offset value, the media gateway 120 may determine whether redundant information of the Nth audio frame is available.

As illustrated in FIG. 9, the (N+2)th packet 160 includes the redundant coding 164 of the Nth audio frame. The media gateway 120 may decode the redundant coding 164 of the Nth audio frame via the decoder 802 and may re-encode the decoded redundant coding 164 as the re-encoding 812. For example, the decoder 802 may decode the redundant coding 164, and the encoder 804 may encode the redundant coding 164 to generate the re-encoding 812. In a particular implementation, the re-encoding 812 may be a primary coding of the second audio frame based on the redundant coding 164. Re-encoding the redundant coding 164 as primary coding may also be referred to as transcoding the redundant coding 164. The media gateway 120 may generate the modified packet 810 that includes the re-encoding 812, and the media gateway 120 may transmit the modified packet 810 to the second device 140 during the Nth time slot 930. The second device 140 may receive the modified packet 810, decode the re-encoding 812 of the Nth audio frame, and generate the Nth audio frame for playback at the second device 140. Thus, the modified packet 810 with the re-encoding 812 may enable the second device 140 to compensate for (or conceal) an error in the packet-switched network 152. If the packet 160 including the redundant coding 164 of the Nth audio frame is not available in the de-jitter buffer 130, the media gateway 120 may perform a different error concealment operation.

If a corresponding packet is received without error at the media gateway 120, the media gateway 120 may forward the packet to the second device 140. For example, the media gateway 120 may receive the (N+1)th packet 902 without error and may transmit the packet 902 to the second device 140 during the (N+1)th time slot 932. As another example, the media gateway 120 may receive the (N+2)th packet 160 without error and may transmit the packet 160 to the second device 140 during the (N+2)th time slot 934. In a particular implementation, the packets 902 and 160 may be forwarded without modification, and the second device 140 may be configured to decode the corresponding primary coding by default. Alternatively, the packets 902 and 160 may include one or more bits (e.g., a bit sequence) that indicate signaling information to specify that the primary coding in each of the packets 902 and 160 is to be decoded.

Thus, FIG. 9 illustrates techniques employed by the media gateway 120 to use redundant coding of audio frames stored in the de-jitter buffer 130 to provide a modified frame with a re-encoding of the redundant information when a packet including primary coding of a particular audio frame is unavailable. Providing the modified frame with the redundant coding of a particular audio frame enables the second device 140 to generate the particular audio frame for playback at the second device 140 and may compensate for (or conceal) a network error in the packet-switched network 152.

Figure 10:
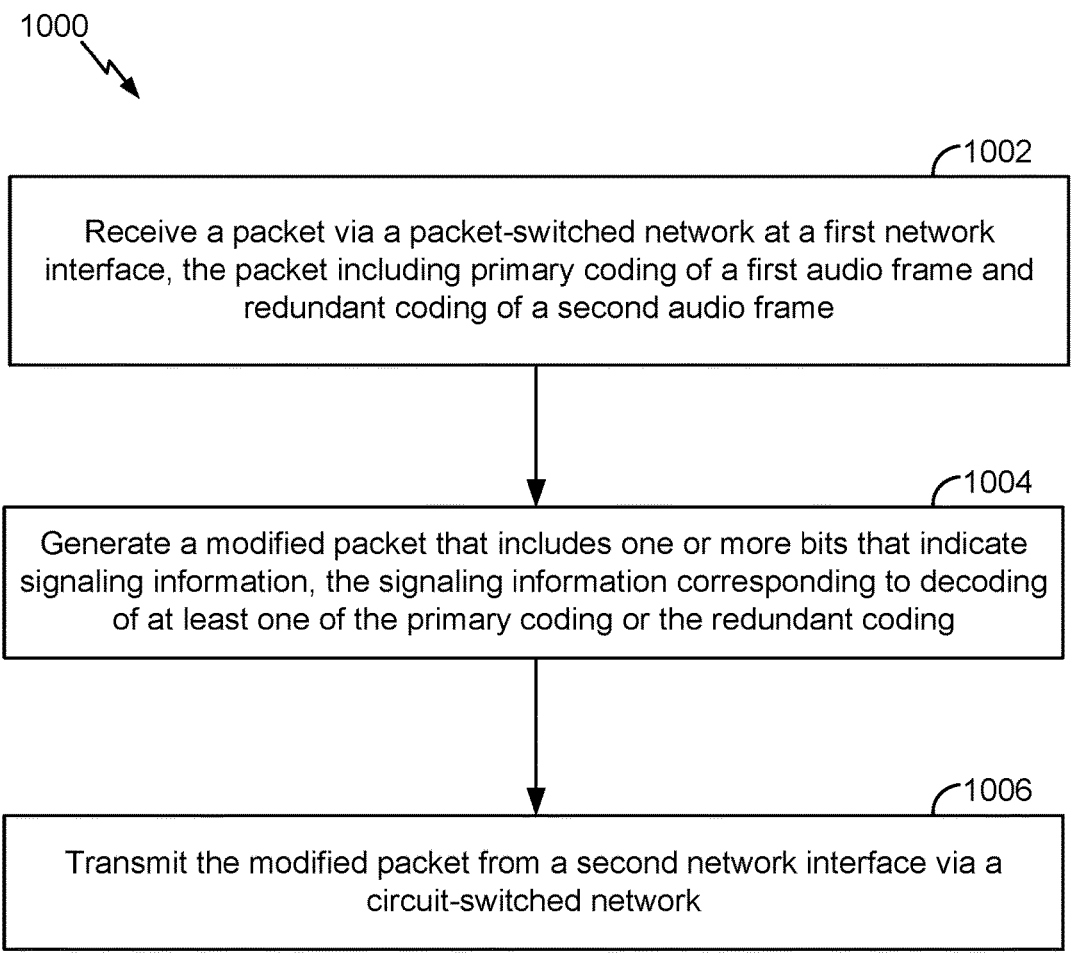
FIG. 10 is a flow chart that illustrates a particular method of modifying an audio packet to include signaling information.

Referring to FIG. 10, a flow chart of a particular illustrative implementation of a method of modifying an audio packet to include one or more bits that indicate signaling information is shown and generally designated 1000. The method 1000 may be performed by the media gateway 120 of FIGS. 1 and 2.

The method 1000 includes receiving a packet via a packet-switched network at a first network interface, at 1002. The packet includes primary coding of a first audio frame and redundant coding of a second audio frame. For example, the packet 160 is received at the first network interface 126 of the media gateway 120 via the packet-switched network 152. The packet 160 includes the primary coding 162 and the redundant coding 164.

The method 1000 includes generating a modified packet that includes one or more bits that indicate signaling information, at 1004. The signaling information corresponds to decoding of at least one of the primary coding or the redundant coding. For example, the processor 122 generates the modified packet 170 by including one or more bits that indicate the signaling information 172 in the modified packet 170. The signaling information 172 corresponds to decoding at least one of the primary coding 162 or the redundant coding 164. For example, the signaling information 172 indicates whether to decode the primary coding 162 or the redundant coding 164. In an implementation, a single bit may indicate the signaling information 172. In one implementation, a "0" value of the single bit may indicate that the primary coding is to be decoded, and a "1" value of the single bit may indicate that the redundant coding is to be decoded.

In a particular implementation, a single bit of the redundant coding 164 may indicate the signaling information 172, as illustrated in FIG. 1. In another implementation, a single bit of the primary coding 162 may indicate the signaling information 172. In another implementation, a bit corresponding to other values in the payload 304, as illustrated in FIG. 3, may indicate the signaling information 172. In other implementations, more than one bit, such as the one or more bits 166 of FIG. 1, may indicate the signaling information 172.

The method 1000 further includes transmitting the modified packet from a second network interface via a circuit-switched network, at 1006. For example, the media gateway 120 transmits the modified packet 170 from the second network interface 128 via the circuit-switched network 154 to the second device 140.

In a particular implementation, the one or more bits 166 of the packet 160 correspond to offset bits. The offset bits may indicate an offset between the first audio frame and the second audio frame in a sequence of audio frames. In another particular implementation, the one or more bits 166 of the packet 160 correspond to a codec type indicator, a redundancy frame flag, a sharp flag, a mode indicator, a bandwidth extension (BWE) layers parameter, or a combination thereof.

In another particular implementation, the method 1000 further includes generating the modified packet 170 in response to a determination that a second packet including primary coding of the second audio frame is unavailable. As an example, the determination that the second packet is unavailable may be based on a determination that the second packet is corrupt. As another example, the determination that the second packet is unavailable is based on a determination that the second packet has not been received. Additionally or alternatively, the modified packet 170 may be transmitted during the Nth time slot 230 (e.g., a time slot associated with the second audio frame).

In a particular implementation, the method 1000 may include watermarking one or more bits 166 of the redundant coding 164 to indicate the signaling information 172, as described with reference to the fourth example 350 of the payload 304 of FIG. 3. In another particular implementation, the primary coding 162 may include an encoded low-band core of the first audio frame and high-band parameters of the first audio frame. Additionally or alternatively, the redundant coding 164 may include a gain shape indicator associated with a high-band gain shape of the second audio frame, a high-band gain frame indicator associated with a high-band gain frame of the second audio frame, a high-band line spectral pair (LSP) indicator associated with high-band LSPs of the second audio frame, or a combination thereof.

Alternatively, the signaling information may be encoded in padding bits. For example, one of the padding bits may correspond to a signaling bit and a value of the signaling bit may indicate whether the redundant coding is to be decoded. In another implementation, the method 1000 includes retrieving a packet from a de-jitter buffer and generating a modified packet from the packet during a time period corresponding to transmission of an audio frame. In another implementation, a packet may include a plurality of bits, some of which correspond to offset bits. The offset bits may correspond to an offset between a first audio frame and a second audio frame in a sequence of audio frames. The signaling information may correspond to a bit of the offset bits.

The method 1000 enables generation of a modified packet having primary coding of a first audio frame, redundant coding of a second audio frame, and signaling information indicating which coding to decode. The modified audio packet may be transmitted in place of a packet associated with an error at a packet-switched network.

Figure 11:
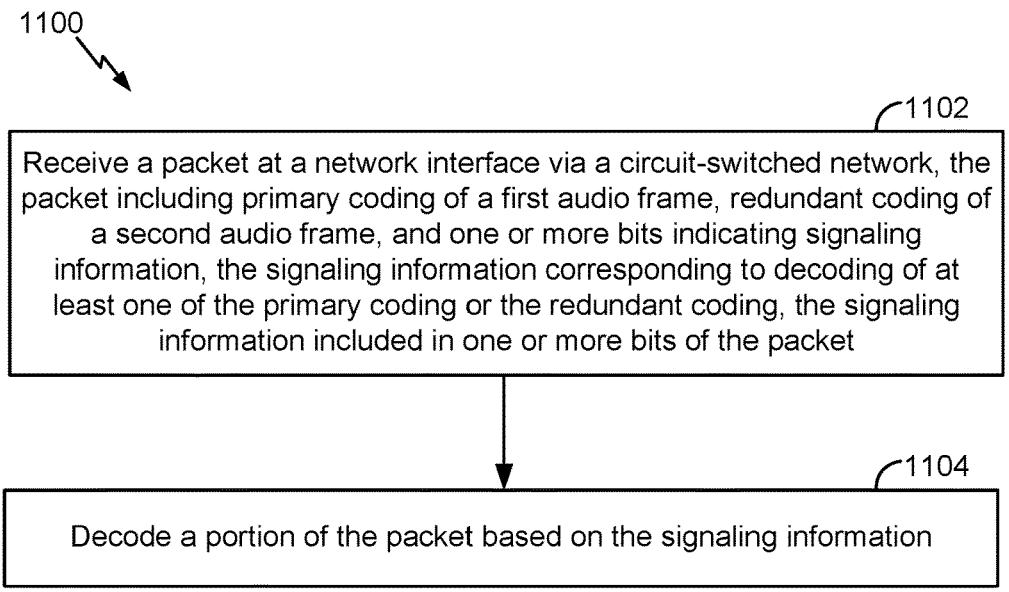
FIG. 11 is a flow chart that illustrates a particular method of decoding an audio packet that includes signaling information.

Referring to FIG. 11, a flow chart of a particular illustrative implementation of a method of decoding an audio packet that includes signaling information is shown and generally designated 1100. The method 1100 may be performed by the second device 140 of FIGS. 1 and 2.

The method 1100 includes receiving a packet at a network interface via a circuit-switched network, at 1102. The packet includes primary coding of a first audio frame, redundant coding of a second audio frame, and signaling information corresponding to decoding of at least one of the primary coding or the redundant coding. One or more bits of the redundant coding may indicate the signaling information. For example, the second device 140 receives the modified packet 170 at the network interface 148 via the circuit-switched network 154. The modified packet 170 includes the primary coding 162, the redundant coding 164, and one or more bits 166 in the redundant coding 164, the one or more bits 166 indicating the signaling information 172. As a particular example, the offset bits region 328 of FIG. 3 may indicate the signaling information 172. The signaling information 172 corresponds to the decoding of at least one of the primary coding 162 or the redundant coding 164. For example, the signaling information 172 indicates whether the primary coding 162 or the redundant coding 164 is to be decoded. Alternatively, a single bit of the redundant coding, the primary coding, or other segment of a payload portion of the modified packet 170 may indicate the signaling information 172.

The method 1100 further includes decoding a portion of the packet based on the signaling information, at 1104. For example, the decoder 146 may decode either the primary coding 162 or the redundant coding 164 based on the signaling information 172.

In a particular implementation, decoding the portion of the modified packet 170 includes decoding the primary coding 162 based on the signaling information 172. Alternatively, decoding the portion of the modified packet 170 includes decoding the redundant coding 164 based on the signaling information 172.

In another particular implementation, the signaling information 172 further indicates an offset between the first audio frame and the second audio frame in a sequence of audio frames. In another particular implementation, the modified packet 170 is received during the Nth time slot 230 (e.g., a time slot associated with a second packet including primary coding of the second audio frame). In another particular implementation, the one or more bits 166 includes an offset field (e.g., the offset bits region 328 of FIG. 3). In another particular implementation, the signaling information 172 is indicated by watermarking of the redundant coding 164.

In another particular implementation, the method 1100 includes storing an undecoded portion of the packet in a pre-redundancy buffer in response to decoding the portion of the packet. For instance, referring to FIG. 1 the second device 140 may be configured to store an undecoded portion of the packet in the pre-redundancy buffer 150. In response to decoding a portion of the packet, the second device 140 may be configured to store the undecoded portion of the packet in the pre-redundancy buffer 150.

The method 1100 may further include, in response to an error condition related to the second packet, retrieving, from the pre-redundancy buffer, the undecoded portion of the packet. For example, referring to FIG. 1, a processor 142 of the second device 140 may be configured to retrieve the undecoded portion of the packet from the pre-redundancy buffer 150 in response to an error condition associated with a second packet received at the second device 140. To elaborate, the second device 140 may receive a second packet at a network interface 148. The second packet may be received via the circuit-switched network 154. The second packet may be received at a time slot subsequent to the time slot at which the packet was received. The second device 140 may be configured to determine that data associated with the second packet has been corrupted. For instance, the second packet may lack certain bits, and the processor 142 of the second device 140 may be configured to determine that such bits are missing.

The method 1100 may additionally include, based on determining that data in the second packet has been corrupted, retrieving the undecoded portion of the packet from the pre-redundancy buffer. The undecoded portion of the packet may correspond to the corrupted data. To illustrate, the processor 142 of the second device 140 may be configured to retrieve the undecoded portion of the packet from the pre-redundancy buffer 150 based on determining that data included in the second packet has been corrupted. The undecoded portion of the packet may be an uncorrupted copy of the corrupted data in the second packet.

The method 1100 enables decoding of a modified packet having primary coding of a first audio frame, redundant coding of a second audio frame, and signaling information indicating which audio frame to decode. The modified packet may be received in place of a packet associated with a network error at a packet-switched network.

Figure 12:
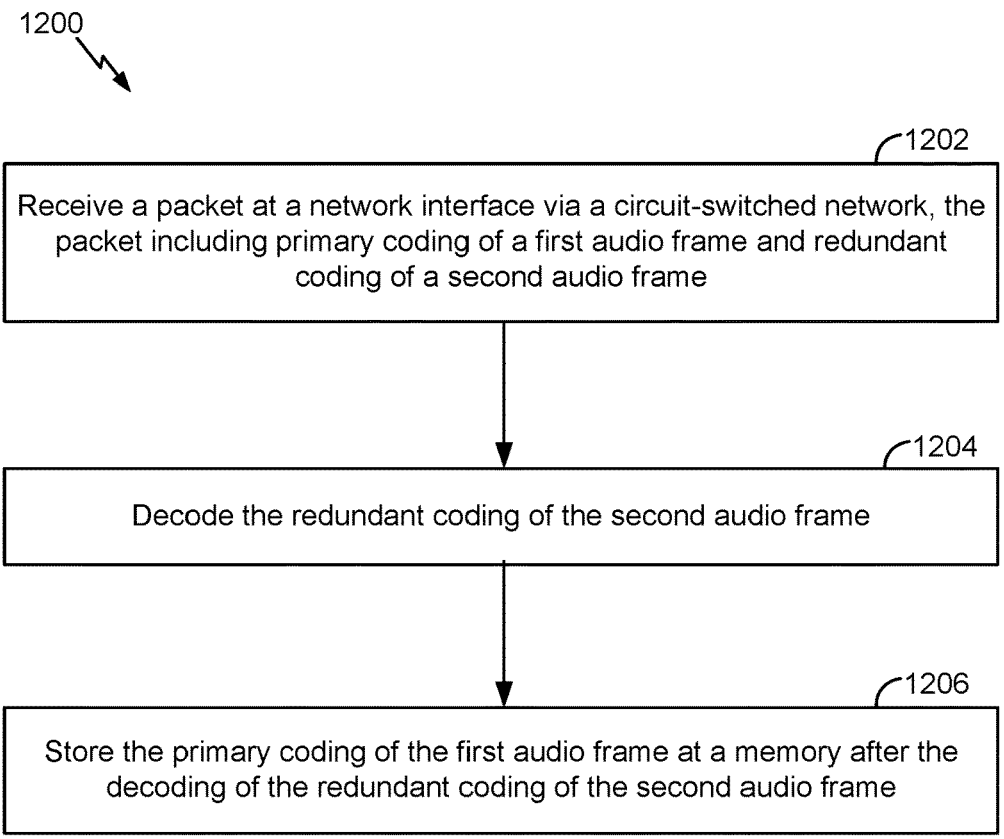
FIG. 12 is a flow chart that illustrates a particular method of maintaining a stored copy of unused frame information in an audio packet.

Referring to FIG. 12, a flow chart of a particular illustrative implementation of a method of maintaining a stored copy of unused frame information in an audio packet is shown and generally designated 1200. The method 1200 may be performed by the second device 140 of FIGS. 1 and 4.

The method 1200 includes receiving a packet at a network interface via a circuit-switched network, at 1202. The packet includes primary coding of a first audio frame and redundant coding of a second audio frame. For example, the second device 140 receives the modified packet 170 at the network interface 148 via the circuit-switched network 154. The modified packet 170 includes the primary coding 162 and the redundant coding 164.

The method 1200 includes decoding the redundant coding of the second audio frame, at 1204. For example, the decoder 146 decodes the redundant coding 164 (e.g., based on the signaling information 172). The method 1200 further includes storing the primary coding of the first audio frame at a memory after the decoding of the redundant coding of the second audio frame, at 1206. For example, the second device 140 stores the primary coding 162 at the pre-redundancy buffer 150 after decoding of the redundant coding 164.

In a particular implementation, the method 1200 includes, at the (N+2)th time slot 444 (e.g., a time slot associated with the first audio frame), retrieving the copy 430 of the primary coding 162 of the first audio frame from the memory 144 (e.g., the pre-redundancy buffer 150) and decoding the first audio frame using the copy 430 of the primary coding 160 of the first audio frame. The primary coding 162 of the first audio frame may be retrieved in response to a determination that an error is associated with the (N+2)th time slot 444. In a particular implementation, the error is determined based on a determination that a second packet including the primary coding 162 of the first audio frame is corrupt. Alternatively, the error may be determined based on a determination that a second packet including the primary coding 162 of the first audio frame has not been received during the (N+2)th time slot 444.

In another particular implementation, the modified packet 170 further includes one or more bits 166 that indicate the signaling information 172. The signaling information 172 specifies whether to decode the primary coding 162 or the redundant coding 164. The redundant coding 164 may be decoded based on the signaling information 172. Additionally or alternatively, the signaling information 172 may further indicate an offset between the first audio frame and the second audio frame in a sequence of audio frames.

In another particular implementation, the modified packet 170 is received from the media gateway 120, during the Nth time slot 440 (e.g., a second time slot associated with the second audio frame), in response to an error associated with receipt of primary coding of the second audio frame at the media gateway 120. Additionally or alternatively, the primary coding 162 may include an encoded low-band core of the first audio frame and high-band parameters of the first audio frame. Additionally or alternatively, the redundant coding 164 may include a gain shape indicator associated with a high-band gain shape of the second audio frame, a high-band gain frame indicator associated with a high-band gain frame of the second audio frame, a high-band line spectral pair (LSP) indicator associated with high-band LSPs of the second audio frame, or a combination thereof.

The method 1200 enables a stored copy of unused audio frame information to be maintained. The stored copy may be used to generate an audio frame when an error occurs in receipt of a packet associated with the unused audio frame.

Figure 13:
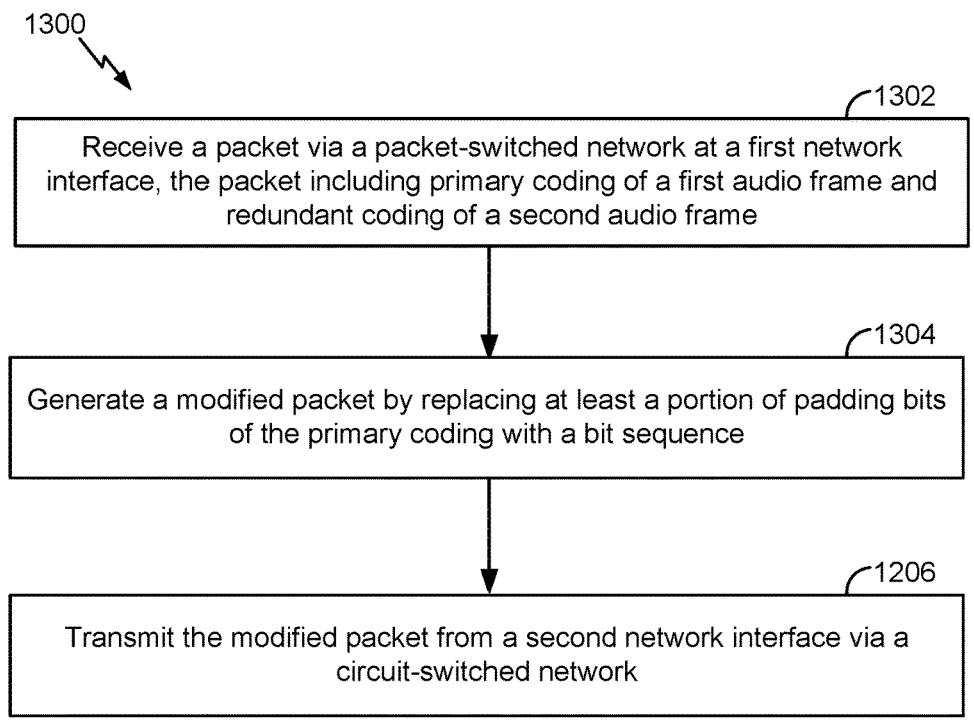
FIG. 13 is a flow chart that illustrates a particular method of re-encoding redundant frame information.

Referring to FIG. 13, a flow chart of a particular illustrative implementation of a method of re-encoding redundant frame information is shown and generally designated 1300. The method 1300 may be performed by the media gateway 120 of FIGS. 8 and 9.

The method 1300 includes receiving a packet via a packet-switched network at a first network interface, at 1302. The packet includes primary coding of a first audio frame and redundant coding of a second audio frame. For example, the first network interface 126 of the media gateway 120 receives the packet 160 via the packet-switched network 152. The packet 160 includes the primary coding 162 and the redundant coding 164.

The method 1300 includes generating a modified packet that includes a re-encoding of the redundant coding of the second audio frame, at 1304. For example, the decoder 802 decodes the redundant coding 164, and the encoder 804 generates the re-encoding 812 of the redundant coding 164. The processor 122 generates the modified packet 810 that includes the re-encoding 812.

The method 1300 further includes transmitting the modified packet from a second network interface via a circuit-switched network, at 1306. For example, the media gateway 120 transmits the modified packet 810 from the second network interface 128 to the second device 140 via the circuit-switched network 154.

In a particular implementation, the method 1300 includes decoding the redundant coding 164 of the second audio frame, where generating the re-encoding 812 of the redundant coding 164 includes generating primary coding of the decoded redundant coding 164 of the second audio frame. Generating the re-encoding 812 may be referred to as transcoding. In another particular implementation, the modified packet 810 is transmitted in response to a determination that a second packet including primary coding of the second audio frame is unavailable.

In another particular implementation, the method 1300 includes generating the re-encoding 812 of the redundant coding 164 in response to receiving the packet 160. Additionally or alternatively, the method 1300 includes storing the re-encoding 812 of the redundant coding 162 at a memory (e.g., the de-jitter buffer 130). In some implementations, the method 1300 further includes retrieving the re-encoding 812 of the redundant coding 164 from the memory (e.g., the de jitter buffer 130) to generate the modified packet 810 in response to a determination that a second packet including primary coding of the second audio frame is unavailable. The determination that the second packet is unavailable may be based on a determination that the second packet is corrupt or that the second packet has not been received.

In another particular implementation, the primary coding 162 includes an encoded low-band core of the first audio frame and high-band parameters of the first audio frame. Additionally or alternatively, the redundant coding 164 includes a gain shape indicator associated with a high-band gain shape of the second audio frame, a high-band gain frame indicator associated with a high-band gain frame of the second audio frame, a high-band line spectral pair (LSP) indicator associated with high-band LSPs of the second audio frame, or a combination thereof.

The method 1300 enables generation of a modified packet having re-encoded redundant frame information. The modified audio packet may be transmitted during a time slot associated with a particular audio frame that is associated with an error at a packet-switched network.

Figure 14:
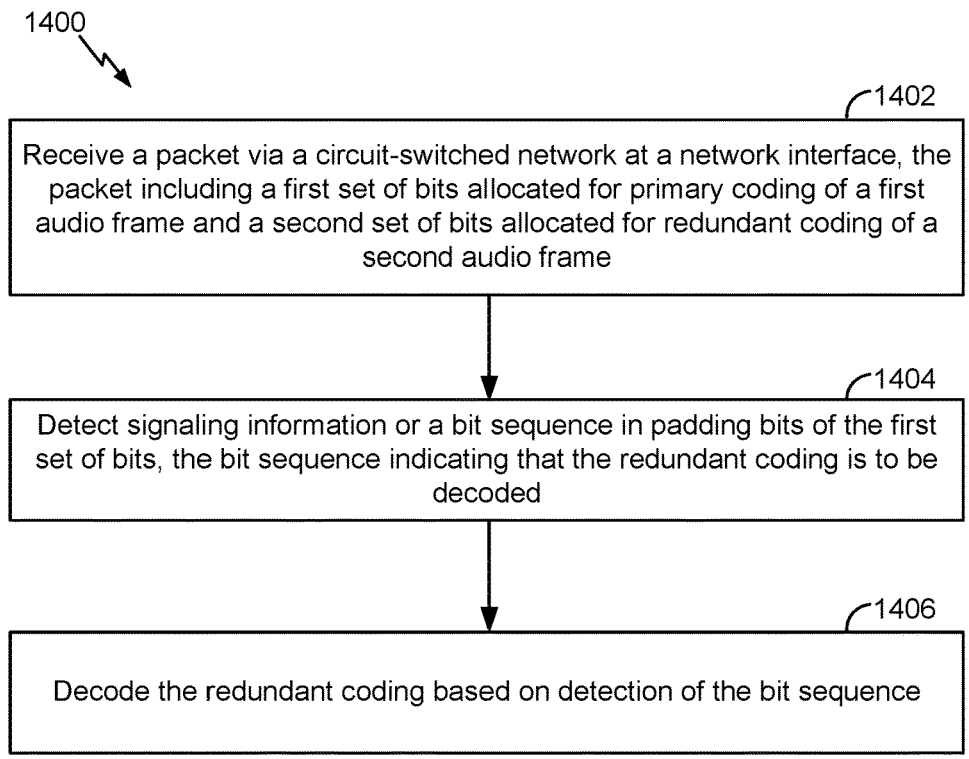
FIG. 14 is a flow chart that illustrates a particular method of modifying an audio packet to include a bit sequence (or other signaling information) that indicates how to decode the modified audio packet.

Referring to FIG. 14, a flow chart of a particular illustrative implementation of a method of modifying an audio packet to include a bit sequence that indicates how to decode the audio packet is shown and generally designated 1400. The method 1400 may be performed by the media gateway 120 of FIGS. 5 and 6.

The method 1400 includes receiving a packet via a packet-switched network at a first network interface, at 1402. The packet includes primary coding of a first audio frame and redundant coding of a second audio frame. For example, the first network interface 126 of the media gateway 120 receives the packet 160 via the packet-switched network 152. The packet 160 includes the primary coding 162 and the redundant coding 164.

The method 1400 includes generating a modified packet by replacing at least a portion of padding bits of the primary coding with a bit sequence, at 1404. For example, the processor 122 may replace at least a portion of the padding bits 502 of the primary coding 162 with the bit sequence 512 to generate the modified packet 510. In an implementation, generating the modified packet 510 may include overwriting at least one or more pad bits of the primary coding portion or one or more offset bits of the redundant coding portion of the packet. In another implementation, the modified packet may be generated by placing a single bit (i.e., comprising signaling information) within the padding bits or pad bits portions of a packet that is transmitted at a rate of 13.2 kilobits per second, which may be referred to as a "13.2 kilobits per second packet."

The method 1400 further includes transmitting the modified packet from a second network interface via a circuit-switched network, at 1406. For example, the media gateway 120 may transmit the modified packet 510 from the second network interface 128 to the second device 140 via the circuit-switched network 154.

In a particular implementation, the bit sequence 512 (or the signaling information 172) indicates that the redundant coding 164 is to be decoded. Additionally or alternatively, the bit sequence 512 (or the signaling information 172) includes a predetermined sequence of bit values. The bit sequence may include all one values or at least one non-zero value, as non-limiting examples.

In another particular implementation, the method 1400 includes generating the modified packet 510 in response to a determination that a second packet including primary coding of the second audio frame is unavailable. The determination that the second packet is unavailable may be based on a determination that the second packet is corrupt. Alternatively, the determination that the second packet is unavailable may be based on a determination that the second packet has not been received. Additionally or alternatively, the modified packet 510 may be transmitted during the Nth time slot 630 (e.g., a time slot associated with the second audio frame). In another particular implementation, one or more bits 166 of the primary coding 162 or the redundant coding 164 may be watermarked to indicate signaling information (e.g., the signaling information 172 of FIG. 1).

In a particular implementation, the primary coding 162 may include an encoded low-band core of the first audio frame and high-band parameters of the first audio frame. Additionally or alternatively, the redundant coding 164 may include a gain shape indicator associated with a high-band gain shape of the second audio frame, a high-band gain frame indicator associated with a high-band gain frame of the second audio frame, a high-band line spectral pair (LSP) indicator associated with high-band LSPs of the second audio frame, or a combination thereof.

In another particular implementation, the processor 122 may be configured to refrain from modifying the audio packet when the second network interface 128 is configured to transmit the audio packet via the packet-switched network 152. Refraining from modifying the packet may include not generating a modified packet by replacing a portion of the padding bits of a received packet and instead transmitting the received packet via the packet-switched network.

The method 1400 enables generation of a modified packet having a bit sequence that indicates how to decode the modified audio packet. The modified audio packet may be transmitted during a time slot of a particular audio frame that is associated with an error at a packet-switched network.

Figure 15:
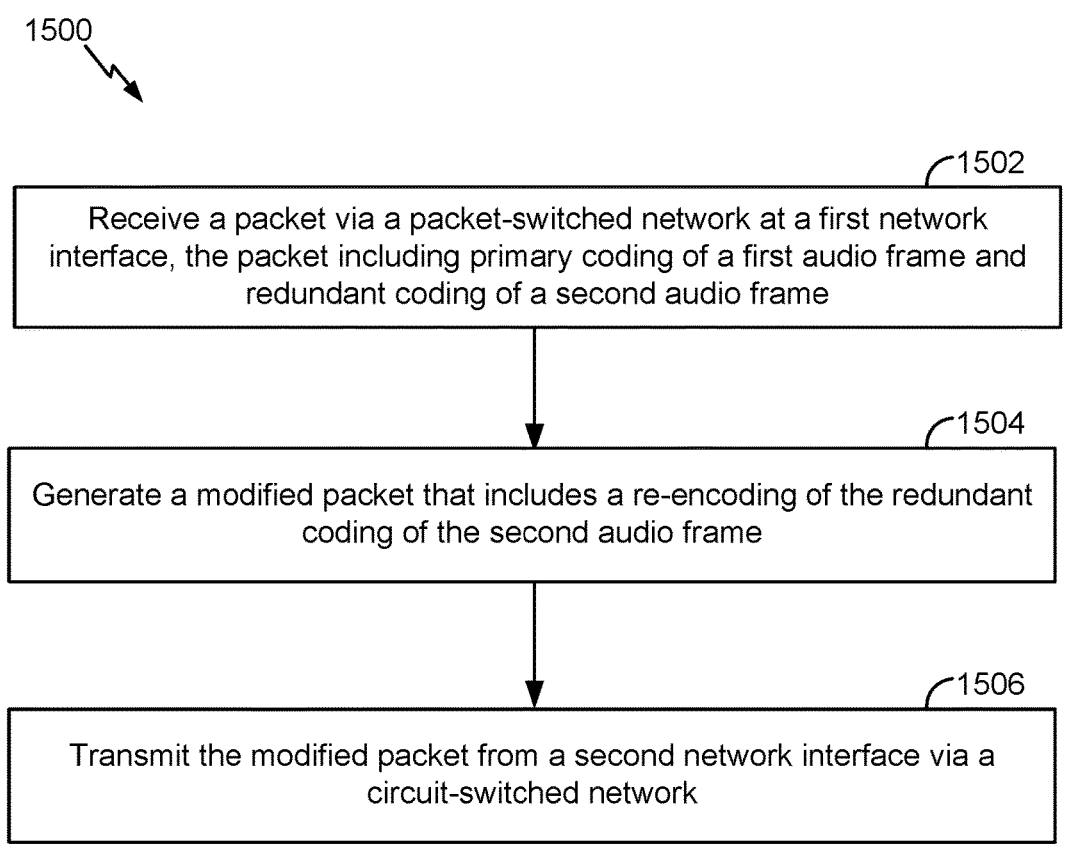
FIG. 15 is a flow chart that illustrates a particular method of decoding an audio packet that includes a particular bit sequence.

Referring to FIG. 15, a flow chart of a particular illustrative implementation of a method of decoding an audio packet that includes a particular bit sequence is shown and generally designated 1500. The method 1500 may be performed by the second device 140 of FIGS. 5 and 6.

The method 1500 includes receiving a packet via a circuit-switched network at a network interface, at 1502. The packet includes a first set of bits allocated for primary coding of a first audio frame and a second set of bits allocated for redundant coding of a second audio frame. For example, the network interface 148 of the second device 140 may receive the modified packet 510 via the circuit-switched network 154. The modified packet 510 may include a first set of bits allocated for the primary coding 162 and a second set of bits allocated for the redundant coding 164.

The method 1500 includes detecting a bit sequence in the first set of bits, the bit sequence indicating that the redundant coding is to be decoded, at 1504. For example, the processor 142 may detect the bit sequence 512 (or the signaling information 172) in the first set of bits. The bit sequence 512 (or the signaling information 172) may indicate that the redundant coding 164 is to be decoded.

The method 1500 further includes decoding the redundant coding based on detection of the bit sequence, at 1506. For example, the decoder 146 may decode the redundant coding 164 based on detection of the bit sequence 512 (or the signaling information 172).

In a particular implementation, the bit sequence 512 (or the signaling information 172) may be detected in a portion of padding bits of the first set of bits. In another particular implementation, the bit sequence 512 includes a predetermined sequence of bit values. For example, the bit sequence 512 may include all zero values. Alternatively, the bit sequence 512 may include all one values. Alternatively, the bit sequence 512 may include at least one non-zero value. In another particular implementation, the modified packet 510 is received during the Nth time slot 630 (e.g., a time slot associated with the second audio frame).

The method 1500 enables decoding of a modified packet having primary coding of a first audio frame, redundant coding of a second audio frame, and a bit sequence indicating which audio frame to decode. The modified packet may be received in place of a packet associated with a network error at a packet-switched network.

Figure 16:
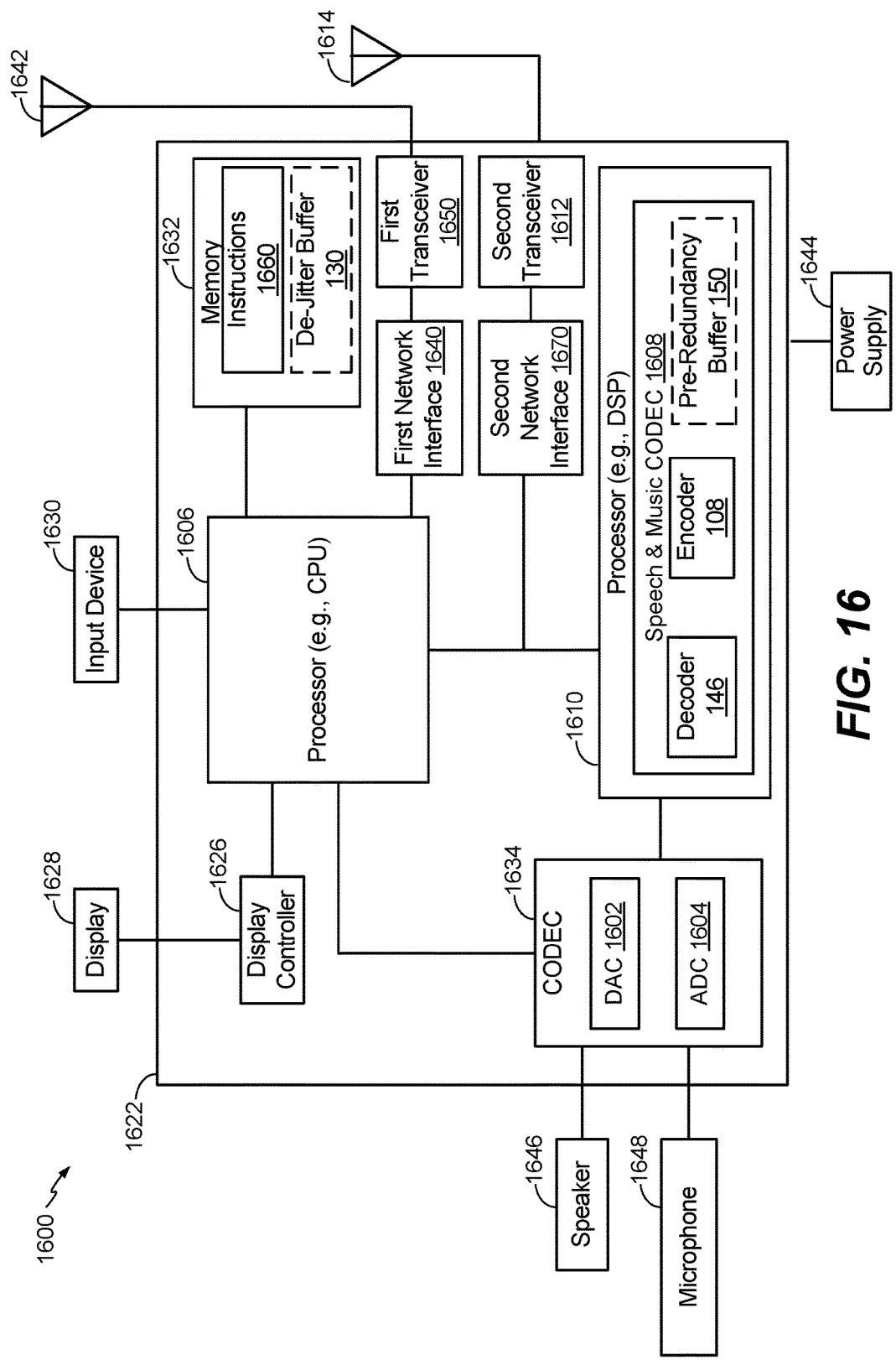
FIG. 16 is a block diagram of a wireless device that is operable to perform operations in accordance with the systems and methods of FIGS. 1-15.

Referring to FIG. 16, a block diagram of a particular illustrative implementation of a mobile device (e.g., a wireless communication device) is depicted and generally designated 1600. In various implementations, the device 1600 may have more or fewer components than illustrated in FIG. 16. In an illustrative implementation, the device 1600 may correspond to one or more of the first device 102, the media gateway 120, and the second device 140 of FIGS. 1, 5, and 8.

In a particular implementation, the device 1600 includes a processor 1606 (e.g., a central processing unit (CPU)). The device 1600 may include one or more additional processors 1610 (e.g., one or more digital signal processors (DSPs)). The processors 1610 may include a speech and music coder-decoder (CODEC) 1608. In one implementation, the speech and music CODEC 1608 may include a vocoder encoder (e.g., the encoder 108 of FIGS. 1, 5, and 8), a vocoder decoder (e.g., the decoder 146 of FIGS. 1, 4, 5, 7, and 8), or both. In a particular implementation, the speech and music CODEC 1608 may be an enhanced voice services (EVS) CODEC that communicates in accordance with one or more specifications or protocols, such as a 3rd Generation Partnership Project (3GPP) EVS protocol. In an alternative implementation, the device 1600 may include a memory 1632 and a CODEC 1634. Although not shown, the memory 1632 may include the primary coding 162, the redundant coding 164 of FIG. 1, or both. The memory 1632 may include a de-jitter buffer 130. In an implementation, the de-jitter buffer 130 may be configured to store the packet 160. The device 1600 may include a first network interface 1640 coupled, via a first transceiver 1650, to a first antenna 1642. The device 1600 may further include a second network interface 1670 coupled, via a second transceiver 1612, to a second antenna 1614.

The device 1600 may include a display 1628 coupled to a display controller 1626. A speaker 1646, a microphone 1648, or a combination thereof, may be coupled to the CODEC 1634. The CODEC 1634 may include a DAC 1602 and an ADC 1604. In a particular implementation, the CODEC 1634 may receive analog signals from the microphone 1648, convert the analog signals to digital signals using the ADC 1604, and provide the digital signals to the processor 1610. The processor 1610 may process the digital signals. In a particular implementation, the processor 1610 may provide digital signals to the CODEC 1634. The CODEC 1634 may convert the digital signals to analog signals using the DAC 1602 and may provide the analog signals to the speaker 1646.

In a particular implementation, the device 1600 may be included in a system-in-package or system-on-chip device 1622. In a particular implementation, the memory 1632, the processor 1606, the processor 1610, the display controller 1626, the CODEC 1634, the first network interface 1640, the second network interface 1670, the first transceiver 1650, and the second transceiver 1612 are included in a system-in-package or system-on-chip device 1622. In a particular implementation, an input device 1630 and a power supply 1644 are coupled to the system-on-chip device 1622. Moreover, in a particular implementation, as illustrated in FIG. 16, the display 1628, the input device 1630, the speaker 1646, the microphone 1648, the first antenna 1642, the second antenna 1614, and the power supply 1644 are external to the system-on-chip device 1622. In a particular implementation, each of the display 1628, the input device 1630, the speaker 1646, the microphone 1648, the first antenna 1642, the second antenna 1614, and the power supply 1644 may be coupled to a component of the system-on-chip device 1622, such as an interface or a controller.

The device 1600 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof.

In an illustrative implementation, the memory 1632 includes or stores instructions 1660 (e.g., executable instructions) such as computer-readable instructions or processor-readable instructions. For example, the memory 1632 may include or correspond to a non-transitory computer-readable medium storing the instructions 1660. The instructions 1660 may include one or more instructions that are executable by a computer, such as the processor 1606 or the processor 1610. The instructions 1660 may cause the processor 1606 or the processor 1610 to perform any of the methods 1000-1500 of FIGS. 10-15.

In a particular implementation, the first network interface 1640 may be configured to receive the modified packet 170 via the circuit-switched network 154. The modified packet 170 includes the primary coding 162, the redundant coding 164, and the signaling information 172. The decoder 146 may be configured to decode a portion of the modified packet 170 based on the signaling information 172, as described with reference to FIGS. 1 and 2. In another particular implementation, the first network interface 1640 may be configured to receive, via the circuit-switched network 154, the modified packet 170 including the primary coding 162 and the redundant coding 164. The decoder 146 may be configured to decode the redundant coding 164, and the pre-redundancy buffer 150 may be configured to store the primary coding 162 after decoding of the redundant coding 164, as described with reference to FIGS. 1 and 4.

In another particular implementation, the first network interface 1640 may be configured to receive, via the circuit-switched network 154, the modified packet 510 including a first set of bits allocated for primary coding (e.g., the primary coding 162) and a second set of bits allocated for redundant coding (e.g., the redundant coding 164). The processor 1606 or the processor 1610 may be configured to detect the bit sequence 512 in the first set of bits, and the decoder 146 may be configured to decode the redundant coding 164 based on detection of the bit sequence 512, as described with reference to FIGS. 5 and 6. In another implementation, the wireless interface is configured to receive, via the circuit-switched network 154, the modified packet 510 including one or more bits indicating signaling information. The decoder 146 may be configured to decode a portion of the modified packet 510 based on the signaling information.

In a particular implementation, the first network interface 1640 may be configured to receive a packet 160 via a packet-switched network 152. For example, the first network interface 1640 may receive the packet 160 via the first transceiver 1650 and the first antenna 1642. The packet 160 may include a primary coding 162 of a first audio frame and a redundant coding 164 of a second audio frame. The processor 1606 may be configured to generate a modified packet 170. One or more bits of the modified packet 170 may indicate the signaling information 172. For example, a single bit of the primary coding 162 or of the redundant coding 164 may indicate the signaling information 172. Alternatively, the modified packet may include one or more bits that indicate signaling information 172. The second network interface may configured to transmit the modified packet 170 via a circuit-switched network 154. For instance, the modified packet 170 may be transmitted to the circuit-switched network through the second transceiver 1612 and the second antenna 1614.

Figure 17:
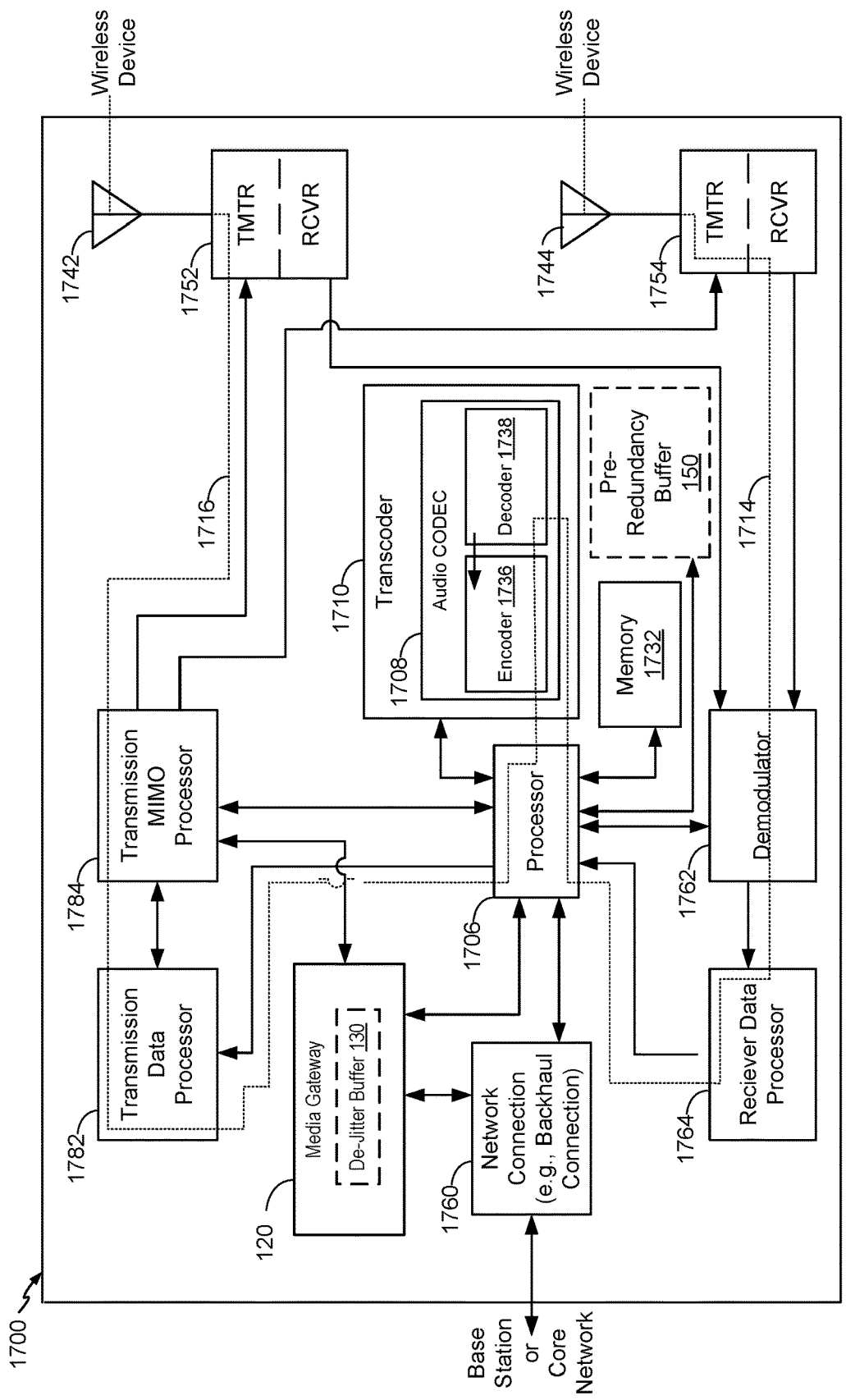
FIG. 17 is a block diagram of a base station that is operable to perform operations in accordance with the systems and methods of FIGS. 1-15.

Referring to FIG. 1700, a block diagram of a particular illustrative example of a base station 1700 is depicted. In various implementations, the base station 1700 may have more components or fewer components than illustrated in FIG. 17. In a first illustrative example, the base station 1700 may correspond to the second device 140. In a second illustrative example, the base station 1700 may include the media gateway 120 of FIG. 1. The base station 1700 may operate according to one or more of the methods of FIGS. 10, 13, and 15.

The base station 1700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a mobile gateway, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the first device 102 or the second device 140 of FIG. 1.

Various functions may be performed by one or more components of the base station 1700 (and/or in other components not shown), such as sending and receiving messages and data (e.g., audio data). In a particular example, the base station 1700 includes a processor 1706 (e.g., a CPU). The base station 1700 may include a transcoder 1710. The transcoder 1710 may include an audio CODEC 1708. For example, the transcoder 1710 may include one or more components (e.g., circuitry) configured to perform operations of the audio CODEC 1708. As another example, the transcoder 1710 may be configured to execute one or more computer-readable instructions to perform the operations of the audio CODEC 1708. Although the audio CODEC 1708 is illustrated as a component of the transcoder 1710, in other examples one or more components of the audio CODEC 1708 may be included in the processor 1706, another processing component, or a combination thereof. For example, a decoder 1738 (e.g., a vocoder decoder) may be included in a receiver data processor 1764. As another example, an encoder 1736 (e.g., a vocoder encoder) may be included in a transmission data processor 1782.

The transcoder 1710 may function to transcode messages and data between two or more networks. The transcoder 1710 may be configured to convert message and audio data from a first format (e.g., a digital format) to a second format. To illustrate, the decoder 1738 may decode encoded signals having a first format and the encoder 1736 may encode the decoded signals into encoded signals having a second format. Additionally or alternatively, the transcoder 1710 may be configured to perform data rate adaptation. For example, the transcoder 1710 may downconvert a data rate or upconvert the data rate without changing a format of the audio data. To illustrate, the transcoder 1710 may downconvert 64 kbit/s signals into 16 kbit/s signals.

The audio CODEC 1708 may include the encoder 1736 and the decoder 1738. The encoder 1736 may include an encoder selector, a speech encoder, and a non-speech encoder. The decoder 1738 may include a decoder selector, a speech decoder, and a non-speech decoder.

In an implementation, the base station 1700 may include a pre-redundancy buffer 150. Alternatively or additionally, the base station 1700 may include a de-jitter buffer 130, and the base station 1700 may include a memory 1732. The memory 1732, such as a computer-readable storage device, may include instructions. The instructions may include one or more instructions that are executable by the processor 1706, the transcoder 1710, or a combination thereof. The base station 1700 may include multiple transmitters and receivers (e.g., transceivers), such as a first transceiver 1752 and a second transceiver 1754, coupled to an array of antennas. The array of antennas may include a first antenna 1742 and a second antenna 1744. The array of antennas may be configured to wirelessly communicate with one or more wireless devices. For example, the second antenna 1744 may receive a data stream 1714 (e.g., a bit stream) from a wireless device. The data stream 1714 may include messages, data (e.g., encoded speech data), or a combination thereof. A first network interface 126 of the media gateway 120 may correspond to the first transceiver 1752, and a second network interface 128 of the media gateway 120 may correspond to the second transceiver 1754.

The base station 1700 may include a network connection 1760, such as backhaul connection. The network connection 1760 may be configured to communicate with a core network or one or more base stations of the wireless communication network. For example, the base station 1700 may receive a second data stream (e.g., messages or audio data) from a core network via the network connection 1760. The base station 1700 may process the second data stream to generate messages or audio data and provide the messages or the audio data to one or more wireless device via one or more antennas of the array of antennas or to another base station via the network connection 1760. In a particular implementation, the network connection 1760 may be a wide area network (WAN) connection, as an illustrative, non-limiting example. In some implementations, the core network may include or correspond to a Public Switched Telephone Network (PSTN), a packet backbone network, or both.

The base station 1700 may include a media gateway 120 that is coupled to the network connection 1760 and the processor 1706. The media gateway 120 may be configured to convert between media streams of different telecommunications technologies. For example, the media gateway 120 may convert between different transmission protocols, different coding schemes, or both. To illustrate, the media gateway 120 may convert from PCM signals to Real-Time Transport Protocol (RTP) signals, as an illustrative, non-limiting example. The media gateway 120 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.). In a particular implementation, the media gateway 120 may include a de-jitter buffer 130. The media gateway 120 is configured to perform the methods described in FIGS. 10, 13, and 15.

The base station 1700 may include a demodulator 1762 that is coupled to the transceivers 1752, 1754, the receiver data processor 1764, and the processor 1706, and the receiver data processor 1764 may be coupled to the processor 1706. The demodulator 1762 may be configured to demodulate modulated signals received from the transceivers 1752, 1754 and to provide demodulated data to the receiver data processor 1764. The receiver data processor 1764 may be configured to extract a message or audio data from the demodulated data and send the message or the audio data to the processor 1706.

The base station 1700 may include a transmission data processor 1782 and a transmission multiple input-multiple output (MIMO) processor 1784. The transmission data processor 1782 may be coupled to the processor 1706 and the transmission MIMO processor 1784. The transmission MIMO processor 1784 may be coupled to the transceivers 1752, 1754 and the processor 1706. In some implementations, the transmission MIMO processor 1784 may be coupled to the media gateway 1770. The transmission data processor 1782 may be configured to receive the messages or the audio data from the processor 1706 and to code the messages or the audio data based on a coding scheme, such as CDMA or orthogonal frequency-division multiplexing (OFDM), as an illustrative, non-limiting examples. The transmission data processor 1782 may provide the coded data to the transmission MIMO processor 1784.

The coded data may be multiplexed with other data, such as pilot data, using CDMA or OFDM techniques to generate multiplexed data. The multiplexed data may then be modulated (i.e., symbol mapped) by the transmission data processor 1782 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1706.

The transmission MIMO processor 1784 may be configured to receive the modulation symbols from the transmission data processor 1782 and may further process the modulation symbols and may perform beamforming on the data. For example, the transmission MIMO processor 1784 may apply beamforming weights to the modulation symbols.

The beamforming weights may correspond to one or more antennas of the array of antennas from which the modulation symbols are transmitted.

During operation, the second antenna 1744 of the base station 1700 may receive a data stream 1714. The second transceiver 1754 may receive the data stream 1714 from the second antenna 1744 and may provide the data stream 1714 to the demodulator 1762. The demodulator 1762 may demodulate modulated signals of the data stream 1714 and provide demodulated data to the receiver data processor 1764. The receiver data processor 1764 may extract audio data from the demodulated data and provide the extracted audio data to the processor 1706.

The processor 1706 may provide the audio data to the transcoder 1710 for transcoding. The decoder 1738 of the transcoder 1710 may decode the audio data from a first format into decoded audio data and the encoder 1736 may encode the decoded audio data into a second format. In some implementations, the encoder 1736 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 1710, the transcoding operations (e.g., decoding and encoding) may be performed by multiple components of the base station 1700. For example, decoding may be performed by the receiver data processor 1764 and encoding may be performed by the transmission data processor 1782. In other implementations, the processor 1706 may provide the audio data to the media gateway 1770 for conversion to another transmission protocol, coding scheme, or both. The media gateway 1770 may provide the converted data to another base station or core network via the network connection 1760.

The decoder 1738 and the encoder 1736 may select a corresponding decoder (e.g., a speech decoder or a non-speech decoder) and a corresponding encoder to transcode (e.g., decode and encode) the frame. The decoder 1738 and the encoder 1736 may determine, on a frame-by-frame basis, whether each received frame of the data stream 1714 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 1736, such as transcoded data, may be provided to the transmission data processor 1782 or the network connection 1760 via the processor 1706.

The base station 1700 may therefore include a computer-readable storage device (e.g., the memory 1732) that stores instructions that, when executed by a processor (e.g., the processor 1706 or the transcoder 1710), cause the processor to perform operations including receiving a packet (indicating signaling information) via a circuit-switched network at a network interface and decoding a portion of the packet based on the signaling information.

In an implementation, the transcoded audio data from the transcoder 1710 may be provided to the transmission data processor 1782 for coding according to a modulation scheme, such as OFDM, to generate modulation symbols corresponding to the selected modulation scheme. The transmission data processor 1782 may provide the modulation symbols to the transmission MIMO processor 1784 for further processing and beamforming. The transmission MIMO processor 1784 may apply beamforming weights and may provide data corresponding to the modulation symbols to one or more antennas of the array of antennas, such as the first antenna 1742 via the first transceiver 1752. Thus, the base station 1700 may provide a transcoded data stream 1716, that corresponds to the data stream 1714 received from the wireless device, to another wireless device. The transcoded data stream 1716 may have a different encoding format, data rate, or both, than the data stream 1714. In other implementations, the transcoded data stream 1716 may be provided to the network connection 1760 for transmission to another base station or a core network.

The base station 1700 may include a computer-readable storage device (e.g., the memory 1732) storing instructions that, when executed by a processor (e.g., the processor 1706 or the transcoder 1710), cause the processor to perform operations including receiving a packet via a packet-switched network at a first network interface, the packet including primary coding of a first audio frame and redundant coding of a second audio frame. The operations may further include generating a modified packet that includes one or more bits that indicate signaling information, the signaling information corresponding to decoding of at least one of the primary coding or the redundant coding, and transmitting the modified packet from a second network interface via a circuit-switched network.

In conjunction with the described aspects, a first apparatus includes means for receiving a packet via a packet-switched network, the packet including primary coding of a first audio frame, redundant coding of a second audio frame, and one or more bits related to decoding the first audio frame or the second audio frame. The means for receiving may include or correspond to the first network interface 126 of FIGS. 1, 2, 5; 6, 8, and 9; the first antenna 1642, the first network interface 1640, the first transceiver 1650 of FIG. 16; the first transceiver 1752 or the second transceiver 1754 of FIG. 17; one or more other structures or circuits configured to receive the packet via the packet-switched network; or any combination thereof.

The first apparatus includes means for generating a modified packet that includes one or more bits that indicate signaling information, the signaling information indicating whether to decode the primary coding or the redundant coding. The means for generating may include or correspond to the processor 122 of FIGS. 1, 2, 5, 6, 8, and 9; the processor 1606 or the processor 1610 of FIG. 16; one or more other structures or circuits configured to generate the modified packet; or any combination thereof.

The first apparatus further includes means for transmitting the modified packet via a circuit-switched network. The means for transmitting may include or correspond to the second network interface 128 of FIGS. 1, 2, 5, 6, 8, and 9; the second antenna 1614, the second network interface 1670, and the second transceiver 1612 of FIG. 16; the first transceiver 1752 or the second transceiver 1754 of FIG. 17; one or more other structures or circuits configured to transmit the modified packet via the circuit-switched network, or any combination thereof.

The first apparatus further includes means for storing a re-encoding of a redundant coding. The means for storing may correspond to the memory 124 of FIGS. 1, 2, 5, 8, and 9. Moreover, the first apparatus may further include means to store and reorder packets received from a packet-switched network based on identifiers in the packets, such as timestamps or sequence numbers. The means to store and reorder packets may correspond to the de-jitter buffer 130 of FIGS. 1, 2, 5, 8, and 16; one or more other structures or circuits configured to transmit the modified packet via the circuit-switched network; or any combination thereof.

In conjunction with the described aspects, a second apparatus includes means for receiving a packet via a circuit-switched network, the packet including primary coding of a first audio frame, redundant coding of a second audio frame, and signaling information indicating whether to decode the primary coding or the redundant coding, the signaling information included in one or more bits of the packet. The means for receiving may include or correspond to the network interface 148 of FIGS. 1, 4, 5, 7, and 8, the first antenna 1642, the first network interface 1640, the first transceiver 1650 of FIG. 16, one or more other structures or circuits configured to receive the packet via the circuit-switched network, or any combination thereof. In a particular implementation, the one or more bits may comprise a sequence of bits.

The second apparatus further includes means for decoding a portion of the packet based on the signaling information. The means for decoding may include or correspond to the decoder 146 of FIGS. 1, 4, 5, 7, and 8; the speech and music CODEC 1608 or the processor 1610 of FIG. 16; the processor 1706 of FIG. 17; one or more other structures or circuits configured to decode the portion of the packet based on the signaling information; or any combination thereof.

The second apparatus may further include means for storing the primary coding responsive to the redundant coding being decoded. The means for storing the primary coding may include or correspond to the pre-redundancy buffer 150 of FIGS. 1, 4, 5, 7, 8. 16, and 17. Alternatively or additionally, the second apparatus further includes means for storing the redundant coding responsive to the primary coding being decoded. The means for storing the redundant coding may include or correspond to the pre-redundancy buffer 150 of FIGS. 1, 4, 5, 7, 8, 16, and 17.

In conjunction with the described aspects, a third apparatus includes means for receiving a packet via a circuit-switched network, the packet including primary coding of a first audio frame and redundant coding of a second audio frame. The means for receiving may include or correspond to the network interface 148 of FIGS. 1, 4, 5, 7, and 8; the first antenna 1642, the first network interface 1640, and the first transceiver 1650 of FIG. 16; one or more other structures or circuits configured to receive the packet via the circuit-switched network; or any combination thereof.

The third apparatus includes means for decoding the redundant coding of the second audio frame. The means for decoding may include or correspond to the decoder 146 of FIGS. 1, 4, 5, 8, and 16; the speech and music CODEC 1608 or the processor 1610 of FIG. 16; one or more other structures or circuits configured to decode the redundant coding; or any combination thereof.

The third apparatus further includes means for storing the primary coding of the first audio frame after the decoding of the redundant coding of the second audio frame. The means for storing may include or correspond to the memory 144 of FIGS. 1, 4, 5, 7, and 8; the pre-redundancy buffer 150 of FIGS. 1, 4, 5, 7, 8, and 16; the memory 1632 of FIG. 16; one or more other structures or circuits configured to store the primary coding; or any combination thereof.

In conjunction with the described aspects, a fourth apparatus includes means for receiving a packet via a packet-switched network, the packet including primary coding of a first audio frame and redundant coding of a second audio frame. The means for receiving may include or correspond to the first network interface 126 of FIGS. 1, 2, 5, 6, 8 and 9; the first antenna 1642, the first network interface 1640, and the first transceiver 1650 of FIG. 16; one or more other structures or circuits configured to receive the packet via the packet-switched network; or any combination thereof.

The fourth apparatus includes means for generating a modified packet that includes a re-encoding of the redundant coding of the second audio frame. The means for generating may include or correspond to the processor 122 of FIGS. 1, 2, 5, 6, 8, and 9; the processor 1606 or the processor 1610 of FIG. 16; one or more other structures or circuits configured to generate the modified packet; or any combination thereof.

The fourth apparatus further includes means for transmitting the modified packet from a second network interface via a circuit-switched network. The means for transmitting may include or correspond to the second network interface 128 of FIGS. 1, 5, 6, 8, and 9; the second antenna 1614, the second network interface 1670, and the second transceiver 1612 of FIG. 16; one or more other structures or circuits configured to transmit the modified packet via the circuit-switched network; or any combination thereof.

In conjunction with the described aspects, a fifth apparatus includes means for receiving a packet via a packet-switched network, the packet including primary coding of a first audio frame and redundant coding of a second audio frame. The means for receiving may include or correspond to the first network interface 126 of FIGS. 1, 2, 5, 6, 8, and 9; the first antenna 1642, the first network interface 1640, and the first transceiver 1650 of FIG. 16; one or more other structures or circuits configured to receive the packet via the packet-switched network; or any combination thereof.

The fifth apparatus includes means for generating a modified packet by replacing at least a portion of the primary coding with a bit sequence. The means for generating may include or correspond to the processor 122 of FIGS. 1, 2, 5, 6, 8, and 9; the processor 1606 or the processor 1610 of FIG. 16; one or more other structures or circuits configured to generate the modified packet; or any combination thereof.

The fifth apparatus further includes means for transmitting the modified packet via a circuit-switched network. The means for transmitting may include or correspond to the second network interface 128 of FIGS. 1, 2, 5, 6, 8, and 9; the second antenna 1614; the second network interface 1670; and the second transceiver 1612 of FIG. 16; one or more other structures or circuits configured to transmit the modified packet via the circuit-switched network; or any combination thereof.

In conjunction with the described aspects, a sixth apparatus includes means for receiving a packet via a circuit-switched network, the packet including a first set of bits allocated for primary coding of a first audio frame and a second set of bits allocated for redundant coding of a second audio frame. The means for receiving may include or correspond to the network interface 148 of FIGS. 1, 4, 5, 7, and 8; the first antenna 1642, the first network interface 1640, and the first transceiver 1650 of FIG. 16; one or more other structures or circuits configured to receive the packet via the packet-switched network; or any combination thereof.

The sixth apparatus includes means for detecting a bit sequence in the first set of bits, the bit sequence indicating that the redundant coding is to be decoded. The means for detecting may include or correspond to the processor 142 of FIGS. 1, 4, 5, 7, and 8; the processor 1606 or the processor 1610 of FIG. 16; one or more other structures or circuits configured to detect the bit sequence in the first set of bits; or any combination thereof.

The sixth apparatus further includes means for decoding the redundant coding based on detection of the bit sequence.

The means for decoding may include or correspond to the decoder 146 of FIGS. 1, 4, 5, 7, 8, and 16; the speech and music CODEC 1608, the processor 1606, or the processor 1610 of FIG. 16; one or more other structures or circuits configured to decode the redundant coding; or any combination thereof.

One or more of the disclosed aspects may be implemented in a system or an apparatus, such as the device 1600, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as handheld personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-17 may illustrate systems, apparatuses, and/or methods according to the teachings of the disclosure, the disclosure is not limited to these illustrated systems, apparatuses, and/or methods. One or more functions or components of any of FIGS. 1-17 as illustrated or described herein may be combined with one or more other portions of another of FIGS. 1-17. Accordingly, no single implementation described herein should be construed as limiting and implementations of the disclosure may be suitably combined without departing form the teachings of the disclosure. As an example, one or more of the methods of FIGS. 10-15, individually or in combination, may be performed by the processors 104, 122, and 142 of FIGS. 1, 5, and 8, the processors 1606 or 1610 of FIG. 16, or the processor 1706 of FIG. 17. To illustrate, a portion of one of the methods FIGS. 10-15 may be combined with a second portion of one of the methods of FIGS. 10-15. Additionally, one or more operations described with reference to the FIGS. 10-15 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
    a network interface configured to receive, via a circuit-switched network and during a first time period, a packet that includes primary coding of a first audio frame, redundant coding of a second audio frame, and one or more bits that indicate signaling information, the signaling information indicating which of the primary coding or the redundant coding is to be decoded, the circuit-switched network associated with communication of audio frames to devices during fixed time intervals;
    a processor configured to determine the signaling information based on the one or more bits and to initiate an audio output based on the decoded primary coding or the decoded redundant coding;
    a pre-redundancy buffer configured to store a portion of the packet; and
    a decoder configured to decode the primary coding or the redundant coding based on the signaling information.

2. The apparatus of claim 1, wherein the pre-redundancy buffer comprises a memory, and wherein the memory is configured to store the redundant coding responsive to the primary coding being decoded.

3. The apparatus of claim 1, wherein the pre-redundancy buffer comprises a memory, and wherein the memory is configured to store the primary coding responsive to the redundant coding being decoded.

4. The apparatus of claim 3, wherein the decoder is further configured to:
    during a time slot associated with the second audio frame, decode the redundant coding of the second audio frame based on the signaling information; and
    during a time slot associated with the first audio frame, retrieve the primary coding of the first audio frame from the pre-redundancy buffer and decode the first audio frame using the primary coding of the first audio frame.

5. The apparatus of claim 1, wherein the one or more bits comprise a single bit, wherein a first value of the single bit indicates the primary coding is to be decoded, and wherein a second value of the single bit indicates the redundant coding is to be decoded.

6. The apparatus of claim 1, wherein the one or more bits is included in the redundant coding.

7. The apparatus of claim 6, wherein the one or more bits comprise a plurality of bits, and wherein at least some of the plurality of bits represent an offset between the first audio frame and the second audio frame.

8. The apparatus of claim 1, wherein the primary coding includes the one or more bits that indicate the signaling information.

9. The apparatus of claim 1, wherein the one or more bits comprise a plurality of bits, and wherein a watermarking of the plurality of bits indicates the signaling information.

10. The apparatus of claim 1, further comprising:
an antenna; and
a transceiver coupled to the antenna and to the network interface, the transceiver configured to receive the packet.

11. The apparatus of claim 10, wherein the network interface, the decoder, the antenna, and the transceiver are integrated into a mobile device.

12. The apparatus of claim 10, wherein the network interface, the decoder, the antenna, and the transceiver are integrated into a base station.

13. The apparatus of claim 1, wherein the primary coding includes an encoded low-band core of the first audio frame and high-band parameters of the first audio frame, and wherein the redundant coding includes low-band redundant coding information of the second audio frame, high-band parameter redundant coding of the second audio frame, or both.

14. The apparatus of claim 13, wherein the redundant coding includes a partial copy of the second audio frame, and wherein a size of the primary coding of the first audio frame is greater than a size of the redundant coding of the second audio frame.

15. A method of wireless communication, the method comprising:
receiving a packet at a network interface via a circuit-switched network and during a first time period, the packet including primary coding of a first audio frame, redundant coding of a second audio frame, and one or more bits indicating signaling information, the signaling information indicating which of the primary coding or the redundant coding is to be decoded, the circuit-switched network associated with communication of audio frames to devices during fixed time intervals;
determining the signaling information based on the one or more bits;
decoding the primary coding or the redundant coding based on the signaling information;
initiating an audio output based on the decoded primary coding or the decoded redundant coding; and
storing a portion of the packet in a pre-redundancy buffer.

16. The method of claim 15, wherein the one or more bits comprise a single signaling bit, and wherein the single signaling bit is included in the redundant coding and indicates whether the primary coding or the redundant coding is to be decoded.

17. The method of claim 15, wherein the one or more bits comprise a single signaling bit, and wherein the single signaling bit is included in the primary coding and indicates whether the primary coding or the redundant coding is to be decoded.

18. The method of claim 15, wherein storing the portion of the packet comprises storing an undecoded portion of the packet in the pre-redundancy buffer in response to decoding the primary coding or the redundant coding.

19. The method of claim 18, further comprising, in response to a packet loss related to a second packet, retrieving, from the pre-redundancy buffer, the undecoded portion of the packet, wherein the second packet corresponds to a second time period that is subsequent to the first time period.

20. The method of claim 18, further comprising:
receiving a second packet at the network interface, the second packet received at a second time slot subsequent to a time slot at which the packet was received;
determining that data within the second packet is corrupt; and
based on determining that the data is corrupt, retrieving, from the pre-redundancy buffer, the undecoded portion of the packet, the undecoded portion corresponding to the data.

21. The method of claim 15, wherein the primary coding is decoded based on the signaling information.

22. The method of claim 15, wherein the redundant coding is decoded based on the signaling information.

23. The method of claim 15, wherein the packet is received at a first device that includes the network interface from a second device of the circuit-switched network, and wherein the primary coding, the redundant coding, or both originated at a third device of a packet-switched network, and wherein the packet-switched network is associated with individual routing of packets between a source device and a destination device.

24. The method of claim 15, further comprising:
storing an undecoded portion of the packet in a pre-redundancy buffer in response to decoding the primary coding or the redundant coding;
receiving a second packet at the network interface during a second time period that is subsequent to the first time period;
based on determining that the second packet is corrupt, retrieving, from the pre-redundancy buffer, the undecoded portion of the packet; and
decoding the undecoded portion.

25. An apparatus comprising:
means for receiving, via a circuit-switched network, a packet that includes primary coding of a first audio frame, redundant coding of a second audio frame, and one or more bits that indicate signaling information, the signaling information indicating which of the primary coding or the redundant coding is to be decoded, the circuit-switched network associated with communication of audio frames to devices during fixed time intervals;
means for determining the signaling information based on the one or more bits and for initiating an audio output based on the decoded primary coding or the decoded redundant coding;
means for storing a portion of the packet;
means for decoding the primary coding or the redundant coding based on the signaling information; and
means for initiating an audio output based on the decoded primary coding or the decoded redundant coding.

26. The apparatus of claim 25, wherein the one or more bits comprise a sequence of bits indicating which of the primary coding or the redundant coding is to be decoded.

27. A computer-readable storage device storing instructions that, when executed by a processor, cause the processor to perform operations comprising:

receiving a packet via a circuit-switched network at a network interface, the packet including primary coding of a first audio frame, redundant coding of a second audio frame, and one or more bits indicating signaling information, the signaling information indicating which of the primary coding or the redundant coding is to be decoded, the circuit-switched network associated with communication of audio frames to devices during fixed time intervals;

determining the signaling information based on the one or more bits;

decoding the primary coding or the redundant coding based on the signaling information;

initiating an audio output based on the decoded primary coding or the decoded redundant coding; and storing a portion of the packet in a pre-redundancy buffer.

28. The computer-readable storage device of claim 27, wherein the operations further comprise:

storing a non-decoded portion of the packet in a memory;

receiving a second packet via the circuit-switched network at the network interface;

determining that the second packet is corrupt; and in response to determining that the second packet is corrupt, retrieving the non-decoded portion of the packet.

* * * * *